(12) United States Patent
Wicks et al.

(10) Patent No.: US 9,744,669 B2
(45) Date of Patent: Aug. 29, 2017

(54) TRUCK UNLOADER VISUALIZATION

(71) Applicant: Intelligrated Headquarters, LLC, Mason, OH (US)

(72) Inventors: Matthew R. Wicks, St. Charles, MO (US); Benjamin Nilson, St. Louis, MO (US); Karthikeyan Yuvaraj, St. Louis, MO (US); Sriram Pavan Tankasala, St. Louis, MO (US)

( * ) Notice: Subject to any disclaimer, the term of this patent is extended or adjusted under 35 U.S.C. 154(b) by 0 days.

(21) Appl. No.: 14/730,926

(22) Filed: Jun. 4, 2015

(65) Prior Publication Data

US 2015/0352721 A1 Dec. 10, 2015

Related U.S. Application Data

(60) Provisional application No. 62/007,735, filed on Jun. 4, 2014.

(51) Int. Cl.
*G06F 7/00* (2006.01)
*B25J 9/16* (2006.01)

(52) U.S. Cl.
CPC ........... *B25J 9/1679* (2013.01); *B25J 9/1664* (2013.01); *B25J 9/1687* (2013.01); *B25J 9/1697* (2013.01); *G05B 2219/40006* (2013.01); *G05B 2219/45056* (2013.01); *Y10S 901/02* (2013.01); *Y10S 901/47* (2013.01)

(58) Field of Classification Search
USPC ....................................... 700/228
See application file for complete search history.

(56) References Cited

U.S. PATENT DOCUMENTS

2014/0205403 A1* 7/2014 Criswell ................. B25J 5/007
414/395

* cited by examiner

*Primary Examiner* — Kyle Logan

(57) ABSTRACT

Methods, devices, systems, and non-transitory process-readable storage media for a computing device of a robotic carton unloader to identify items to be unloaded from an unloading area within imagery.

30 Claims, 18 Drawing Sheets (side)

(overhead)

(behind)

(behind, angle)

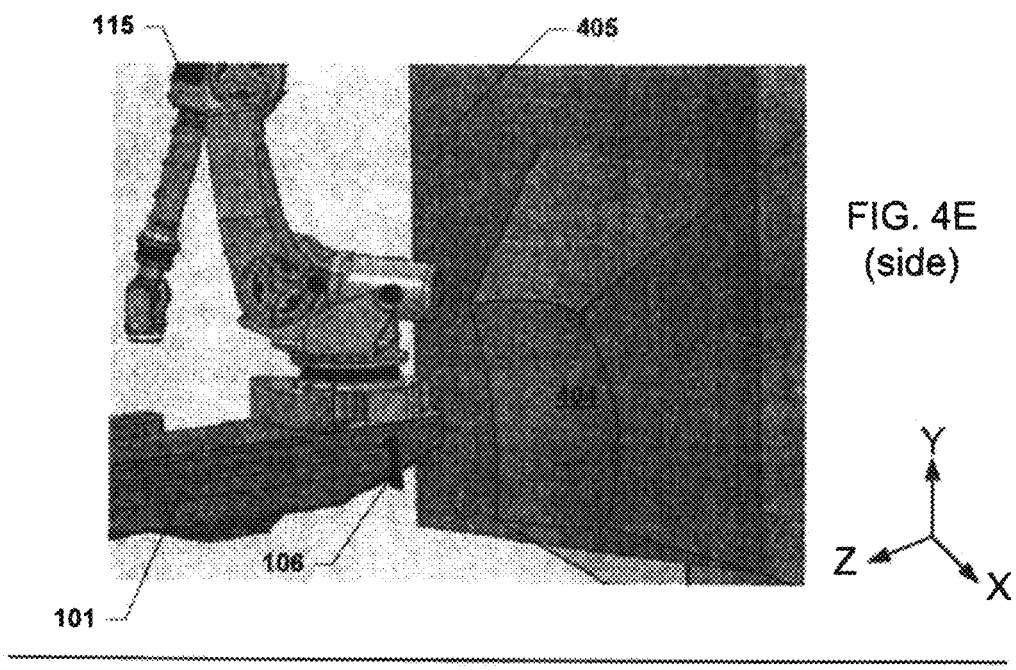
FIG. 4E (side)
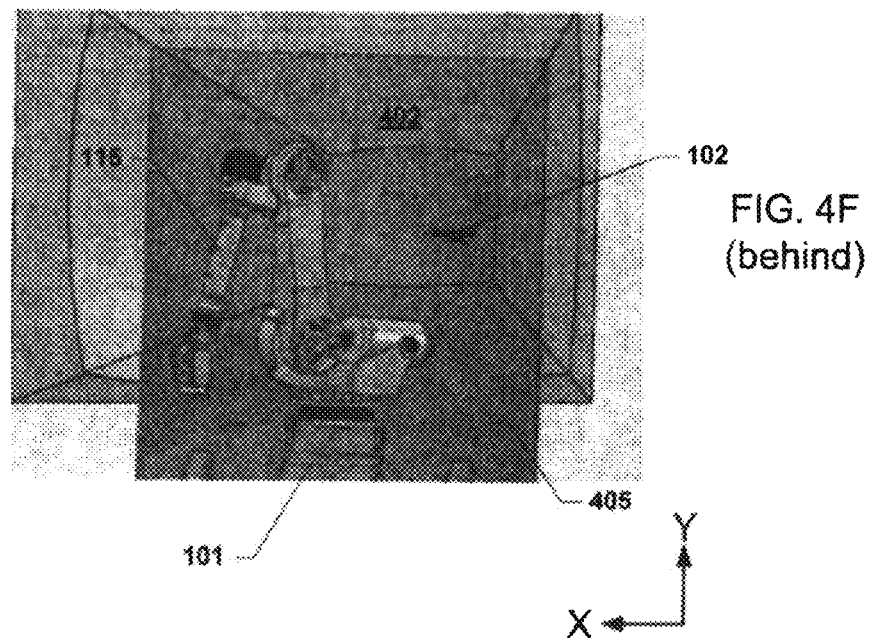
FIG. 4F (behind)

Original skewed view of image of box wall captured by a sensor

Deskewed view of image of box wall (i.e., view with perspective transform)

620 Deskewed view of image of box wall after edge detection processing 630
602
Template image is scanned through the deskewed view of the image using the generalized hough transform.
(The probability of the peak box centers are highlighted)

631
610

602
640
Box template is placed in matching imagery of the deskewed view of the image

610

TRUCK UNLOADER VISUALIZATION

RELATED APPLICATIONS

This application claims the benefit of priority to U.S. Provisional Patent Application No. 62/007,735, filed on Jun. 4, 2014, the entire contents of which are hereby incorporated by reference in their entirety.

BACKGROUND

In general, trucks and trailers loaded with cargo and products move across the country to deliver products to commercial loading and unloading docks at stores, warehouses and distribution centers. Trucks can have a trailer mounted on the truck, or can be of a tractor semi trailer configuration. To lower overhead costs at retail stores, in-store product counts have been reduced, and products-in-transit now count as part of available store stock. Unloading trucks quickly at the unloading docks of warehouses and regional distribution centers has attained new prominence as a way to refill depleted stock. Trucks are typically unloaded with forklifts if the loads are palletized and with manual labor if the products are stacked within the trucks. Unloading large truck shipments manually with human laborers can be physically difficult, and can be costly due to the time and labor involved. Consequently, a significant need exists for an improved unloading system that can unload bulk quantities of stacked cases and cargo from truck trailers more quickly than human laborers and at a reduced cost.

SUMMARY

Various embodiments provide methods, devices, systems, and non-transitory process-readable storage media for a computing device of a robotic carton unloader to identify items to be unloaded from an unloading area within imagery from a vision system. In various embodiments, a method for controlling a robotic carton unloader may include obtaining image data from a first sensor of the robotic carton unloader of a carton pile in a first computing device of the robotic carton unloader, detecting cartons in a face of the carton pile in the image data from the first sensor in the first computing device, sending indications of the detected cartons from the first computing device to a second computing device of the robotic carton unloader, and controlling, by the second computing device, a robotic arm of the robotic carton unloader to unload the detected cartons onto a conveyor of the robotic carton unloader based on the indications of the detected cartons.

Further embodiments include a computing device configured with processor-executable instructions for performing operations of the methods described above. Further embodiments include a non-transitory processor-readable medium on which are stored processor-executable instructions configured to cause a computing device to perform operations of the methods described above. Further embodiments include a communication system including a computing device configured with processor-executable instructions to perform operations of the methods described above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 4A-4F are views of various sensors associated with a robotic carton unloader according to various embodiments.

FIG. 16 is a process flow diagram illustrating an embodiment method for controlling a robotic carton unloader to unload boxes detected by a vision system.

FIG. 17 is a process flow diagram illustrating an embodiment method for detecting boxes imaged by a sensor of a vision system of a robotic carton unloader.

FIG. 18A is process flow diagram illustrating an embodiment method for providing indications of detected boxes from a vision system of a robotic carton unloader.

FIG. 18B is process flow diagram illustrating another embodiment method for providing indications of detected boxes from a vision system of a robotic carton unloader.

FIG. 19 is a component block diagram of a computing device suitable for use in various embodiments.

FIG. 20 is a component block diagram of a server computing device suitable for use in various embodiments.

DETAILED DESCRIPTION

Figure 1:
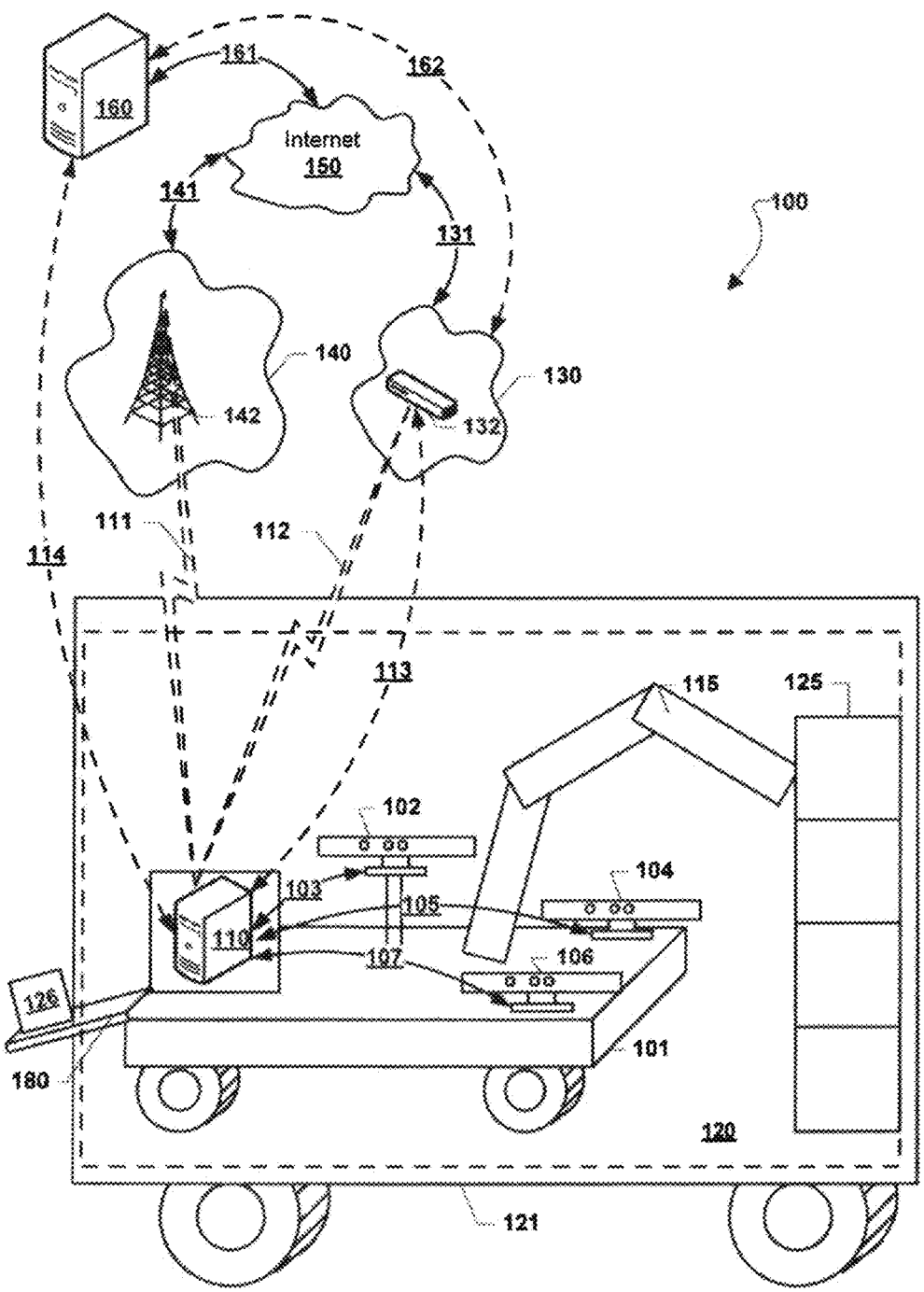
FIG. 1 is a component block diagram of a communication system including an exemplary robotic carton unloader configured with a plurality of sensors suitable for use with various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "computing device" is used herein to refer to any electrical device configured with at least one processor capable of executing various instructions. Computing devices may include one or all of programmable logic controllers (PLCs), programmable automation controllers (PACs), industrial computers, cellular telephones, smartphones (e.g., iPhone), web-pads, tablet computers, Internet enabled cellular telephones, WiFi enabled electronic devices, personal data assistants (PDA's), desktop computers, laptop computers, personal computers, server computing devices, and similar electronic devices equipped with one or more processor configured to perform the various operations described herein.

The term "server" is used to refer to any computing device capable of functioning as a server, such as a master exchange server, web server, mail server, document server, and a personal or mobile computing device configure with software to execute server functions (e.g., a "light server"). A server may be a dedicated computing device or a computing device including a server module (e.g., running an application which may cause the computing device to operate as a server). A server module (or server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a personal or mobile computing device, such as a smart phone, thereby enabling it to function as an Internet server (e.g., an enterprise e-mail server) to a limited extent, such as necessary to provide the functionality described herein.

The various embodiments provide methods, devices, systems, and non-transitory process-readable storage media for a robotic carton unloader having a vision system including a computing device that utilizes imagery from a plurality of sensor devices to identify items to be unloaded from an unloading area. For example, the vision system may be a part of a vehicle that moves within a shipping trailer and may be configured to utilize sensor data to identify "sufficient" information about the individual boxes within a stack of boxes inside the trailer. Such identified information, such as the position (i.e., picking position) and count of boxes to be removed from the unloading area, may be delivered to automatically control the robotic arm of the robotic carton unloader so that the boxes may be efficiently removed for placement on a conveyor system. In other words, based on evaluating sensor device imagery data, the robotic carton unloader may generate output data that enables a downstream picking position algorithm to calculate a target location for positioning the robotic carton unloader's robotic arm for successful 'picking' of the target items (e.g., boxes).

In various embodiments, a computing device associated with the vision system of the robotic carton unloader may be configured to perform various operations for receiving and processing imagery. In particular, the computing device may be configured to obtain color (i.e., red-green-blue or "RGB") image data and depth image data from one or more sensor devices (e.g., cameras) coupled to the computing device. When more than one sensor device is utilized, the sensor devices may be mounted to different locations on the robotic carton unloader such that each provides a different view of a wall of items to be unloaded (e.g., a wall of boxes in a trailer). In some embodiments, there may be one, two, three, or more sensor devices which may be Microsoft Kinect sensor devices (e.g., Kinect version 1, Kinect version 2, etc.). While Microsoft Kinect sensor devices (e.g., Kinect version 1, Kinect version 2, etc.) are discussed herein as examples of sensor devices that may be used with the various embodiments, other type sensors, such as other type sensors that provide RGB and depth data, may be substituted in the various embodiments described herein. The computing device may perform operations to rectify the obtained image data from the different sensor devices. For example, the computing device may perform operations to deskew images such that images from the various sensor devices appear to have a common reference point (e.g., the center of the robotic carton unloader). The computing device may also perform operations to stitch the various image data from the sensor devices in order to generate a combined, singular data set. For example, the computing device may combine an image of a top portion of a wall of boxes, a bottom right portion of the wall, and a bottom left portion of the wall to create a single image of the entire wall.

With the rectified and stitched image data, the computing device may then perform 2D detection operations to identify (or predict the existence of) boxes within the processed image data. Such detection operations may include edge detection operations (e.g., using a Canny technique) as well as matching predefined box template shapes to visual aspects within imagery (e.g., edges). The results of the 2D detection operations (also referred to herein as "hypotheses" or "predictions" of box existence and/or location) are verified by the computing device using 3D data. For example, the computing device may cross-reference 3D data sets that include x, y, and z axis coordinates to the 2D detection hypotheses to determine whether the sizes, distances, and other attributes of the identified boxes are valid. Based on the verified result, the computing device may be configured to provide other elements of the robotic carton unloader with information suitable for controlling the robotic arm to retrieve items from the unloading area.

In some embodiments, the computing device may be configured to locate attributes of all identifiable items (e.g., cartons, boxes, etc.) within the imagery. For example, the computing device may perform image processing operations (e.g., apply a Hough transform) to identify the centroids (e.g., within +/−5 cm (x, y, z)), edges (e.g., the pickup edge of a box with respect to +/−1 cm of the centroid of the box, etc.), surfaces, and other geometry of boxes in a wall of boxes depicted in the imagery. In some embodiments, the computing device may be capable of assessing the conditions in which multiple items are within +/−5 cm (x,y,z) of each other.

In some embodiments, the computing device may assess how the positioning of the sensor devices (e.g., cameras) on the robotic carton unloader and the position of the robotic carton unloader with respect to the items to be unloaded affects the quality of the position estimates. In some embodiments, the computing device may be configured to localize the robotic carton unloader within the unloading area (e.g., the trailer) within a certain number of centimeters (e.g., +/−5 cm).

The various embodiments may or may not account for vibration and other motions encountered by the robotic carton unloader when within an unloading area, as these exterior influences may or may not have a significant impact on a vision system and sensors devices.

In some embodiments, the computing device of the robotic carton unloader may process laser, point cloud, and image data provided by various sensor devices associated with the robotic carton unloader.

The various embodiments may provide a vision system for a robotic carton unloader that enables a single scan operation of a face of a carton pile to be used to unload (or "pick") the scanned face of the carton pile. In the various embodiments, the vision system may be triggered to image a portion of the face of a carton pile, such as a row of the face of the carton pile, a quarter portion of face of the carton pile, half the face of the carton pile, an area of the face of the carton pile visible to one or more sensors, the entire face of the carton pile, or any other size portion of the face of the carton pile, and the vision system may output indications of the boxes in the imaged portion of the face of the carton pile. The robotic carton unloader may then use the indication of the boxes in the face of the carton pile to unload (or "pick") the imaged portion of the face of the carton pile. When the imaged portion of the face of the carton pile has been unloaded, the vision system may once again be triggered to image a new portion of the face of the carton pile. In this manner, the various embodiments may enable a robotic carton unloader to unload (or "pick") an imaged portion of the face of the carton pile without stopping to re-scan the originally imaged portion of the face of the carton pile as boxes are removed from the imaged portion of the face of the carton pile. For example, the robotic carton unloader may unload an entire face of the carton pile based on one initial triggered imaging event of the face of the carton pile. The single image based unloading of the imaged portion of the face of the carton pile may reduce the time to unload the imaged portion of the face of the carton pile because imaging during unloading may not be required.

As used herein the terms "item," "carton," and "box" may be used interchangeably to refer to objects that may be unloaded from an unloading area via a robotic carton unloader. However, it should be appreciated that the various embodiments should not be limited to any particular item or shape of item that may be unloaded from such areas.

FIG. 1 illustrates an embodiment communication system 100 that includes an exemplary robotic carton unloader 101 configured with a plurality of sensor devices 102, 104, 106. The robotic carton unloader 101 may be a mobile vehicle, such as a platform (or frame) with wheels capable of moving through an unloading area 120 (or cargo area). For example, the robotic carton unloader 101 may be designed for use within the trailer of a cargo truck 121. In some embodiments, distance sensors (not shown) may be utilized by the robotic carton unloader 101 to guide the robotic carton unloader 101 into the unloading area 120 (e.g., a semi-trailer). For example, the robotic carton unloader 101 may utilize "curb feeler" distance sensors that use contact to measure distance from the walls of the unloading area 120. Alternately, such distance sensors may use light, sound, or other methods to sense distance.

The robotic carton unloader 101 may be equipped with various components that are mounted-on or otherwise included within the robotic carton unloader 101, such as a robotic arm 115 capable of removing items (e.g., boxes) from a wall of items 125 and placing the items 126 on a conveyor system 180 capable of conveying the items 126 away from the unloading area 120, a plurality of sensor devices 102, 104, 106, and a computing device (e.g., a personal computer, etc.). In some embodiments, the robotic carton unloader 101 may include an operator interface (not shown) or Human Machine Interface (HMI) attached to the conveyor system 180 as well as a joystick, a display (e.g., a monitor), and/or a keypad (not shown). The robotic carton unloader 101 may further include an electronics box (not shown) that may contain electrical components of the control and vision systems of the robotic carton unloader 101. Internally, the robotic carton unloader 101 may include an internal structural frame, wheel drive motors, a vehicle controller, and an energy source (not shown), such as batteries or liquid petroleum (LP) gas to power the robotic carton unloader 101. Embodiment components of the robotic carton unloader 101 are described in greater detail below with reference to FIG. 3.

In various embodiments, the robotic arm 115 may be configured to utilize grasping mechanisms (e.g., claws, clamps, etc.), suction cup mechanisms, and/or lift mechanisms (e.g., ramps, shoveling implements, etc.) to remove items from the wall of items 125. For example, the robotic arm 115 may be configured to grab and/or lift boxes from the top of the wall of items 125 in order to place the boxes on the conveyor system 180. In other embodiments, the robotic carton unloader 101 may be configured carry items away from the unloading area 120 instead of placing items 126 on a conveyor system 180. In some embodiments, the robotic arm 115 may utilize a manipulator head that uses vacuum to remove items from the wall of items 125.

In various embodiments, the items of the wall of items 125 may be generally rectangular prisms with at least one face oriented towards the back of the unloading area 120 (e.g., the back of a semi-trailer). Further, the surfaces of the items of the wall of items 125 may be are textured or otherwise contain features which sensor devices as described below may adequately observe (e.g., record images with sufficient detail, etc.).

A computing device 110 may be included in the robotic carton unloader 101, such as part of a vision system. The computing device 110 may be any electronic device that includes one or more processing units (or processors) capable of executing software, receiving inputs (e.g., signals from the sensor devices 102, 104, 106), and/or outputting data. For example, the computing device 110 may be a custom mobile computing device affixed to the robotic carton unloader 101. As a specific example, the computing device 110 may be a collection of connected computing devices including a computing device, such as a PLC, dedicated to control of the robotic carton unloader 101 and a computing device, such as a personal computer, dedicated to processing image data from each sensor device (e.g., three computing devices for sensor devices 102, 104, 106). In various embodiments, the computing device 110 may be configured to control the operations of the robotic carton unloader 101, such as by controlling the operations of the robotic arm 115 and/or receiving inputs from a controller (e.g., joystick, remote system, etc.) to move the robotic carton unloader 101 within the unloading area 120. The plurality of sensor devices 102, 104, 106 may be coupled to the computing device 110 with wired or wireless connections 103, 105, 107. For example, each of the sensor devices 102, 104, 106 may be directly plugged into the computing device 110 via physical wires (e.g., universal serial bus (USB) connections, Firewire connections, etc.) or may be connected wirelessly to via short-range wireless signals (e.g., Bluetooth, Zigbee, WiFi, WiFi Direct, RF, etc.). In some embodiments, the computing device 110 may include user interface devices (not shown), such as a display, user terminal, etc., capable of displaying data, such as read-outs, application interfaces, and captured sensor data.

In various embodiments, the sensor devices 102, 104, 106 may be configured to capture various representations of the unloading area 120. In particular, the sensor devices 102, 104, 106 may be units capable of generating ranging information based on obtained visual data (e.g., light) and/or audible data, as well as heat data or other forms of energy (e.g., infrared). In some embodiments, the sensor devices 102, 104, 106 may be capable of tracking real-time movement as well as scanning objects three-dimensionally (i.e., 3D scanning). The sensor devices 102, 104, 106 may include one or more camera units and/or microphones. In some embodiments, the sensor devices 102, 104, 106 may be stereo cameras that include more than one lens and image sensors, and further may include different cameras for different types of data that may be captured, such as an infrared sensor and a color camera. The camera units within the sensor devices 102, 104, 106 may include specialized cameras, lens, controllers, and/or software such that the cameras may be capable of obtaining various types of imagery. In particular, the sensor devices 102, 104, 106 may include a camera for capturing color imagery (or "red-green-blue" (RGB)). The sensor devices 102, 104, 106 may be capable of sensing (or calculating) depth utilizing captured and processed visuals from cameras and/or audio from microphones. In some embodiments, the sensor devices 102, 104, 106 may include infrared laser projectors that may be capable of recording 3D data along with monochrome complementary metal-oxide semiconductor (CMOS) sensors.

In some embodiments, the sensor devices 102, 104, 106 may include batteries and/or may be connected to a power source, such as by being coupled to a battery unit included within the robotic carton unloader 101. Further, the sensor devices 102, 104, 106 may include various input and output ports or interfaces, such as USB ports and other elements configured to enable data to be received and/or stored within the sensor devices 102, 104, 106. In some embodiments, the sensor devices 102, 104, 106 may be capable of recording LIDAR data. In some embodiments, the sensor devices 102, 104, 106 may be commercially-available sensor devices, such as Microsoft Kinect™ sensors (e.g., Kinect Version 1, Kinect Version 2, etc.).

In some embodiments, the robotic carton unloader 101 may include stereo camera(s), monocular cameras, and/or LIDAR sensor units (e.g., two-dimensional (2D) LIDAR sensor units). In some embodiments, the sensor devices 104, 106 may be independent monocular cameras mounted as stereo pair stereo baseline. Further, the speed of movement of the robotic carton unloader 101 may be limited in order to improve synchronizing operations of the sensor devices 104, 106. An exemplary robotic carton unloader including LIDAR sensor units is described below with reference to FIG. 2.

In some embodiments, the computing device 110 may include a transceiver capable of exchanging signals with a router device 132 (e.g., a WiFi router) via a wireless connection 112. The router device 132 may be associated with a local area network (LAN) 130 than may be connected to a wide area network (WAN), such as the Internet 150 via a connection 131. In some embodiments, the computing device 110 may be connected to the router device 132 with a wired connection 113. In some embodiments, the computing device 110 may include a transceiver capable of exchanging signals with a base station 142 via a wireless connection 111. The base station 142 may be associated with a cellular network 140 that is connected to the Internet 150 via a connection 141.

In various embodiments, the computing device 110 may be configured to communicate with a remote device 160 via the various networks 130, 140. The remote device 160 may be connected to the local area network 130 via a wired or wireless connection 162 and/or may be otherwise connected to the Internet 150 via a wired or wireless connection 161. Through these communication links, the computing device 110 and the remote device 160 may be capable of exchanging various data, such as cargo reports based on unloading operations performed in the unloading area 120. For example, the remote device 160 and the computing device 110 may be configured to communicate via a common local area network (LAN), such as by exchanging peer-to-peer communications via the LAN 130 within a distribution center. In some embodiments, the computing device 110 may be connected directly to the remote device 160 via a wired or wireless connection 114.

In various embodiments, the remote device may 160 be one or more computing devices (e.g., servers, desktop computers, laptops, etc.) that may be configured to store, process, retrieve, and otherwise handle data related to unloading cargo. For example, the remote device 160 may be a warehouse management server connected to a database(s) and configured to execute software for organizing the delivery of cargo from the unloading area 120 to various departments or sections within a distribution warehouse. In some embodiments, the computing device 110 and the remote device 160 may exchange data between themselves, as well as other devices (e.g., scanners, remote sensors, actuators, diagnostic systems, material handling equipment controls (such as conveyor controls), data stores, scales, printers, etc.) via various network connections, including TCP/IP connections, Ethernet connections, Ethercat connections, PROFIBUS connections, RS 232 connections, USB connections, Wi-Fi connections, cellular connections, etc.

Figure 2:
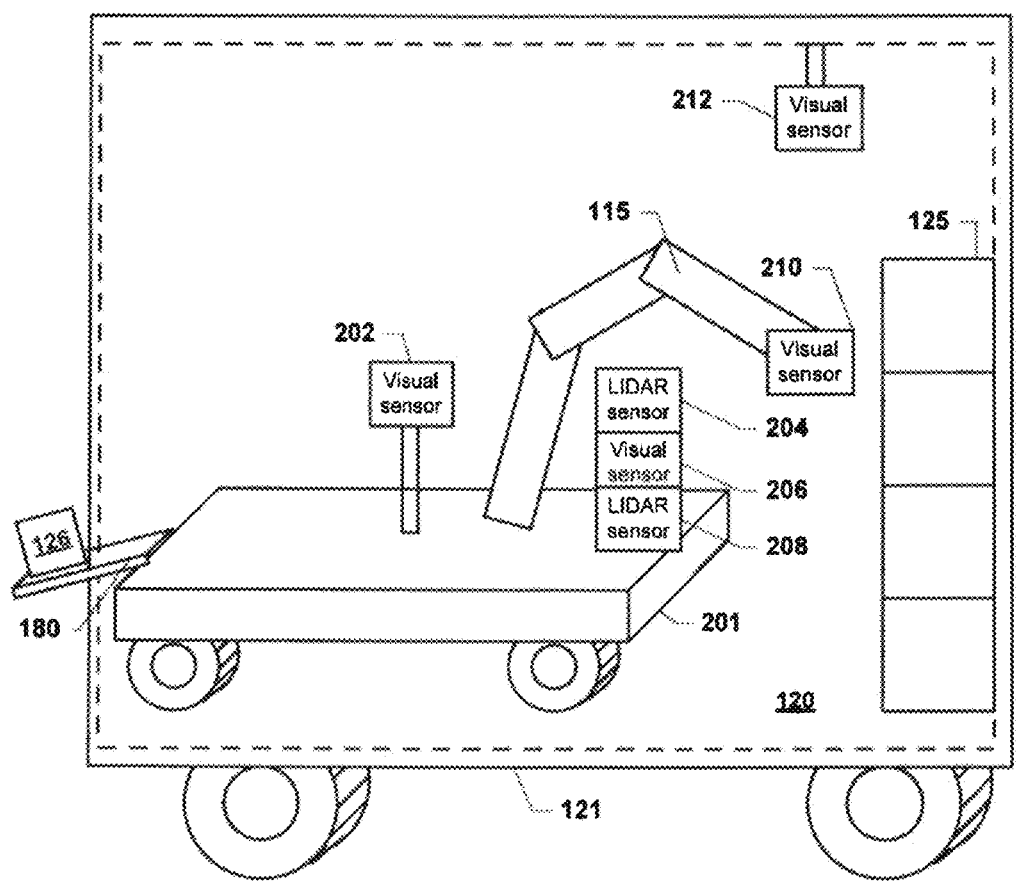
FIG. 2 is a component block diagram of another exemplary robotic carton unloader configured with a plurality of sensors suitable for use with various embodiments.

FIG. 2 illustrates another exemplary robotic carton unloader 201 configured with a plurality of sensors suitable for use with various embodiments. The robotic carton unloader 201 in FIG. 2 may be similar to the robotic carton unloader 101 described above with reference to FIG. 1, except the robotic carton unloader 201 may utilize different sensors and sensor placements. For example, although not shown in FIG. 2, the robotic carton unloader 201 may have the same or similar network connections as described above with reference to FIG. 1, such as a wireless connection to a router, etc.

The robotic carton unloader 201 may include various mounting options for the various sensors 202-212. In particular, the robotic carton unloader 201 may include visual sensors 202, 206, 210 placed around the robotic carton unloader frame and robotic arm 115. LIDAR sensors 204, 208 may be collocated with visual sensors 206. Such placement of the LIDAR sensors 204, 208 may be beneficial in making mutual calibration simpler. In some embodiments, a particular visual sensor 212 may be located above the robotic carton unloader 201, such as affixed to a ceiling or high within the unloading area 120. Such a visual sensor 212 may be coupled to the computing device of the robotic carton unloader 201 (not shown) or alternatively another device, such as the remote device 160 described above with reference to FIG. 1. The location of the LIDAR sensors 204, 208 at the front of the robotic carton unloader 201 may provide the most complete view of the wall of items 125, however may affect throughput for other sensors, such as the visual sensor 210 (or camera) mounted to the end of the robotic arm 115. In other words, for the arm-mounted visual sensor 210, no sensing may be conducted while the robotic arm 115 is in motion. In some embodiments, the LIDAR sensors 208, 204 may be positioned so that they may provide the most complete view of the unloading area 120. However, such positioning may affect the throughput for camera sensors (e.g., the visual sensor 210 on the robotic arm 115). In other words, sensing may not be conducted while the robotic arm 115 is in motion.

Various robotic carton unloaders may be configured with a static setup that may avoid requiring excessive time needed for time syncing between sensors devices.

Figure 3:
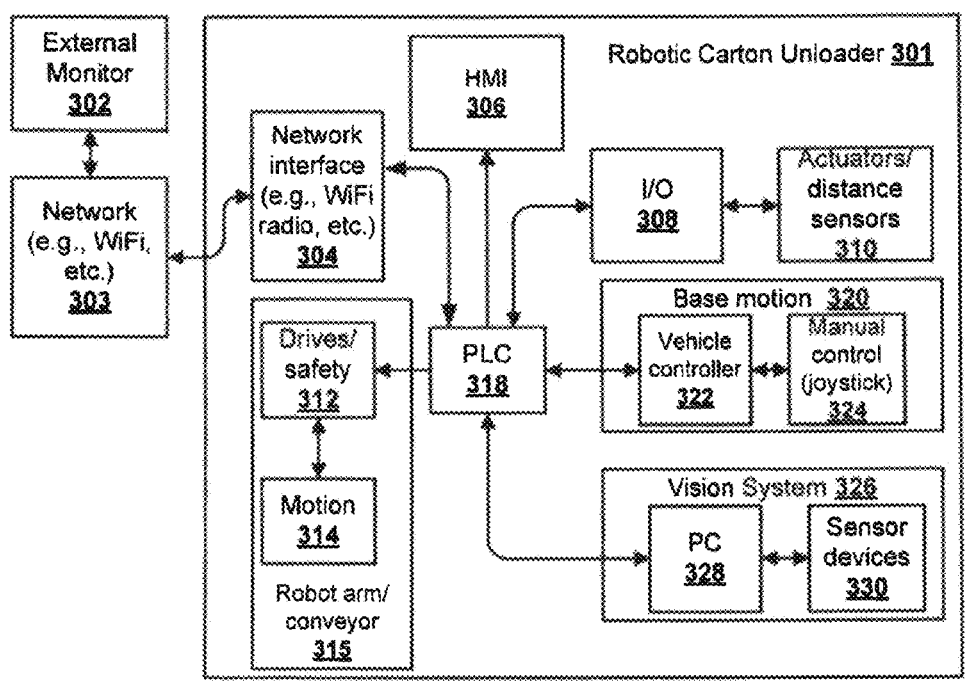
FIG. 3 is a component block diagram of elements of a robotic carton unloader suitable for use in various embodiments.

FIG. 3 illustrates exemplary components of a robotic carton unloader 301 suitable for use in various embodiments. The robotic carton unloader 301 may include an external monitor 302, a network interface module 304, an HMI module 306, an input/output module (I/O module 308), an actuators/distance sensors module 310, a robotic arm and a conveyor system 315 that includes a drives/safety module 312 and a motion module 314, a programmable logic controller (or PLC 318), a base motion module 320 that includes a vehicle controller module 322 and a manual control module 324, and a vision system 326 (or visualization system) that may include one or more computing devices 328 (or "PCs") and sensor devices 330. In some embodiments, vision system 326 of the robotic carton unloader 301 may include a PC 328 connected to each sensor device 330. In embodiments in which more than one sensor device 330 is present on the robotic carton unloader 301, the PCs 328 for each sensor device 330 may be networked together and one of the PC's 328 may operate as a master PC 328 receiving data from the other connected PC's 328, may perform data processing on the received data and its own data (e.g., coordinate transformation, duplicate elimination, error checking, etc.), and may output the combined and processed data from all the PCs 328 to the PLC 318. In some embodiments, the network Interface module 304 may not have a PLC inline between it and the PC 328, and the PLC 318 may serve as the Vehicle Controller and/or Drives/Safety system.

The robotic carton unloader 301 may connect to remote locations or systems with a network interface module 304 (e.g., a Wi-Fi radio, etc.) via a network 303, such as a local area WiFi network. In particular, the network interface module 304 may enable the robotic carton unloader 301 to connect to an external monitor 302. The external monitor 302 may be anyone of a remote warehouse or distribution center control room, a handheld controller, or a computer, and may provide passive remote viewing through the vision system 326 of the robotic carton unloader 301. Alternately, the external monitor 302 may override the programming inherent in the vision system 326 and assume active command and control of the robotic carton unloader 301. Programming for the robotic carton unloader 301 may also be communicated, operated and debugged through external systems, such as the external monitor 302. Examples of an external monitor 302 that assumes command and control may include a remotely located human operator or a remote system, such as a warehouse or distribution server system (i.e., remote device as described above). Exemplary embodiments of using an external monitor 302 to assume command and control of the robotic carton unloader 301 may include human or computer intervention in moving the robotic carton unloader 301, such as from one unloading bay to another, or having the external monitor 302 assume control of the robotic arm to remove an item (e.g., box, carton, etc.) that is difficult to unload with autonomous routines. The external monitor 302 may include any of: a visual monitor, a keyboard, a joystick, an i/o port, a cd reader, a computer, a server, a handheld programming device, or any other device that may be used to perform any part of the above described embodiments.

The robotic carton unloader 301 may include a human machine interface module 306 (or HMI module 306) that may be used to control and/or receive output information for the robot arm and conveyor system 315 and/or the base motion module 320. The HMI module 306 may be used to control (or may itself include) a joystick, a display, and a keypad that may be used for re-programming, over-riding the autonomous control of the machine, and driving the robotic carton unloader 301 from point to point. The actuators 310 that may be actuated individually or in any combination by the vision system 326, and the distance sensors may be used to assist in guiding the robotic carton unloader 301 into an unloaded area (e.g., a trailer). The I/O module 308 may connect the actuators and distance sensors 310 to the PLC 318. The robotic arm and conveyor system 315 may include all components needed to move the arm and/or the conveyor, such as drives/engines and motion protocols or controls. The base motion module 320 may be the components for moving the entirety of the robotic carton unloader 301. In other words, the base motion module 320 may be the components needed to steer the vehicle into and out of unloading areas.

The PLC 318 that may control the overall electromechanical movements of the robotic carton unloader 301 or control exemplary functions, such as controlling the robotic arm or a conveyor system 315. For example, the PLC 318 may move the manipulator head of the robotic arm into position for obtaining items (e.g., boxes, cartons, etc.) from a wall of items. The PLC 318 and other electronic elements of the vision system 326 may mount in an electronics box (not shown) located under a conveyor, adjacent to a conveyor, or elsewhere on the robotic carton unloader 301. The PLC 318 may operate all or part of the robotic carton unloader 301 autonomously and may receive positional information from the distance sensors 310. The I/O module 308 may connect the actuators and the distance sensors 310 to the PLC 318.

The robotic carton unloader 301 may include a vision system 326 that comprises sensor devices 330 (e.g., cameras, microphones, 3D sensors, etc.) and one or more computing device 328 (referred to as a personal computer or "PC" 328). The robotic carton unloader 301 may use the sensor devices 330 and the one or more PC 328 of the vision system 326 to scan in front of the robotic carton unloader 301 in real time or near real time. The forward scanning may be triggered by the PLC 318 in response to determining the robotic carton unloader 301, such as a trigger sent in response to the robotic carton unloader 301 being in position to begin detecting cartons in an unloading area. The forward scanning capabilities may be used for collision avoidance, sent to the human shape recognition (safety), sizing unloaded area (e.g., the truck or trailer), and for scanning the floor of the unloaded area for loose items (e.g., cartons, boxes, etc.). The 3D capabilities of the vision system 326 may also provide depth perception, edge recognition, and may create a 3D image of a wall of items (or carton pile). The vision system 326 may operate alone or in concert with the PLC 318 to recognize edges, shapes, and the near/far distances of articles in front of the robotic carton unloader 301. For example the edges and distances of each separate carton in the wall of items may be measured and calculated relative to the robotic carton unloader 301, and vision system 326 may operate alone or in concert with the PLC 318 to may select specific cartons for removal.

In some embodiments, the vision system 326 may provide the PLC with information such as: specific XYZ coordinate locations of cartons targeted for removal from the unloading area, and one or more movement paths for the robotic arm or the mobile body of the robotic carton unloader 301 to travel. The PLC 318 and the vision system 326 may work independently or together such as an iterative move and visual check process for carton visualization, initial homing, and motion accuracy checks. The same process may be used during vehicle movement, or during carton removal as an accuracy check. Alternatively, the PLC 318 may use the move and visualize process as a check to see whether one or more cartons have fallen from the carton pile or repositioned since the last visual check. While various computing devices and/or processors in FIG. 3, such as the PLC 318, vehicle controller 322, and PC 328, have been described separately, in the various embodiments discussed in relation to FIG. 3 and all the other embodiments described herein, the described computing devices and/or processors may be combined and the operations described herein performed by separate computing devices and/or processors may be performed by less computing devices and/or processors, such as a single computing device or processor with different modules performing the operations described herein. As examples, different processors combined on a single circuit board may perform the operations described herein attributed to different computing devices and/or processors, a single processor running multiple threads/modules may perform operations described herein attributed to different computing devices and/or processors, etc.

Other robotic carton unloader embodiments and component descriptions suitable for use in the various embodiments are described in U.S. Provisional Patent Application No. 61/894,889, entitled "Robotic Carton Unloader with Visualization System," and filed on Oct. 23, 2013, U.S. Provisional Patent Application No. 61/973,188, entitled "Robotic Truck Loader with Alternate Vacuum Head," filed on Mar. 31, 2014, U.S. Non-Provisional patent application Ser. No. 14/279,694, entitled "Robotic Carton Unloader," and filed on May 16, 2014, and U.S. Non-Provisional patent application Ser. No. 14/445,929, entitled "Robotic Carton Unloader," and filed on Jul. 29, 2014. The entire contents of all four applications are incorporated by reference herein in their entirety.

FIGS. 4A-4F illustrate fields of view (or views) of sensor devices associated with a robotic carton unloader according to various embodiments. As described above, the various sensor devices may be part of a vision (or visualization) system employed by the robotic carton unloader in order to image items to be picked and placed on a conveyor system. By employing a plurality of sensor devices placed at different locations/orientations around the robotic arm of the robotic carton unloader, different capture or image-recording views of the sensor devices may be used in combination to obtain a complete view of a wall of items 405 at a given time.

Figure 4A:
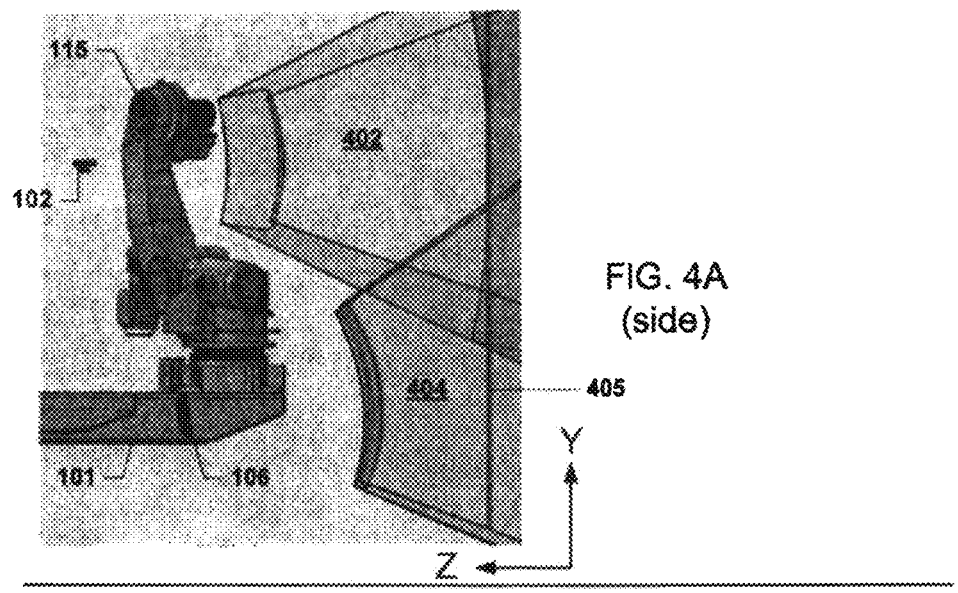

FIG. 4A illustrates a side view of a robotic arm 115 of a robotic carton unloader 101. A third sensor device 106 is placed on the side of the frame of the robotic carton unloader 101 such that its view 404 for capturing imagery of a wall of items 405 to be unloaded from an unloading area (e.g., trailer) is low and to the right side of the robotic arm 115 (i.e., a lower, side portion of the wall of items 405). A first sensor device 102 is placed above the third sensor device 106 such that its view 402 for capturing imagery of the wall of items 405 is higher than the view 404 of the third sensor device 106 (i.e., the upper portion of the wall of items 405). In other words, the first sensor device 102 has a greater y-axis coordinate than the third sensor device 106. The views 402, 402 are shown to overlap such that any resulting image data from the individual sensor devices 102, 106 may include at least a common portion of a representation of the wall of items 405.

It should be noted that when the robotic arm 115 is waiting to receive instructions for picking items from the wall of items 405, the view 404 of the first sensor device 102 may not be occluded by the robotic arm 115 and thus the first sensor device 102 may have a clean view of the entire upper half of the wall of items 405. However, when the robotic arm 115 begins moving to pick items from the wall of items 405, the view 404 of the first sensor device 102 may be occluded.

Figure 4B:
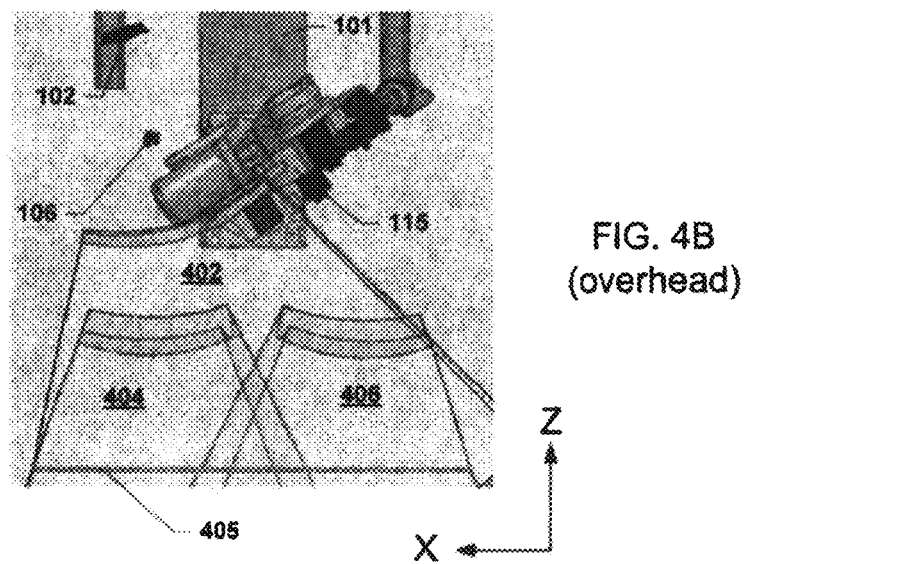

FIG. 4B illustrates a top view of the robotic arm 115 of the robotic carton unloader 101. The first sensor device 102 is shown to be behind the robotic arm 115 and the third sensor device 106. In other words, the first sensor device 102 has a greater z-axis coordinate than the third sensor device 106. Further, the first sensor device 102 is shown to be to the left of the robotic arm 115 and the third sensor device 106. In other words, the first sensor device 102 has a greater x-axis coordinate than the third sensor device 106. FIG. 4B also illustrates a view 406 from a third sensor device that is not shown as it is occluded by the robotic arm 115 in this top-down view of FIG. 4B. In other words, the third sensor device may be underneath (or a lower height) than at least a portion of the robotic arm 115 depicted in FIG. 4B. The views 402, 402, 406 are shown to partially overlap with one another.

Figure 4C:
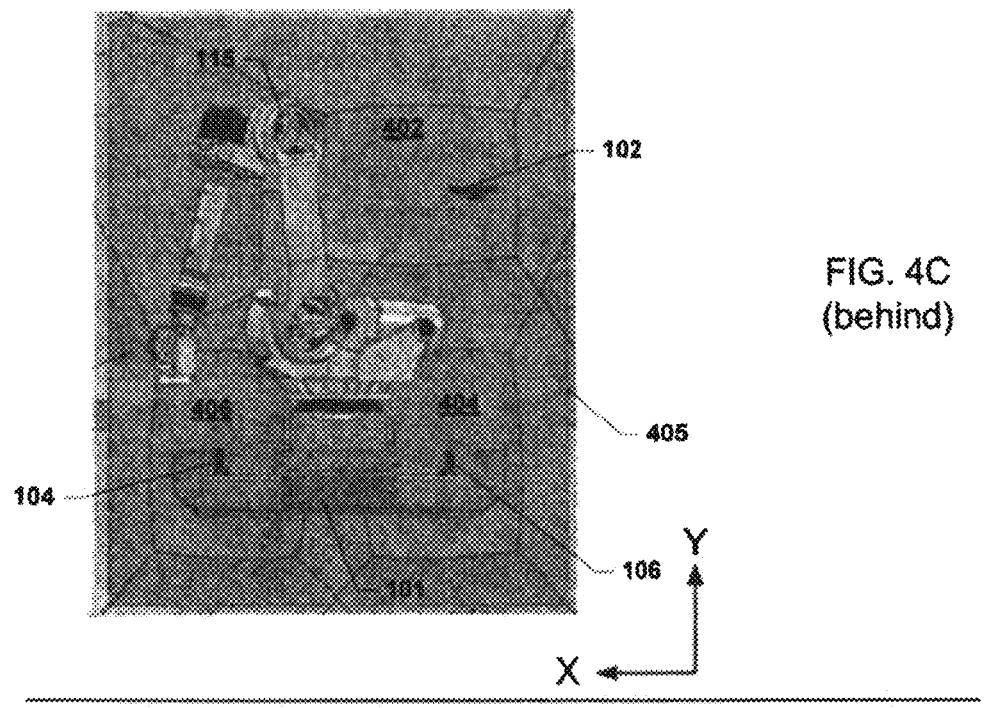

FIG. 4C illustrates a from behind view of the robotic arm 115 of the robotic carton unloader 101. The second sensor device 104 is shown to be placed to the side of the robotic arm 115 opposite from the third sensor device 106. In other words, the third and second sensor devices 106, 104 may be placed symmetrically on the frame of the robotic carton unloader 101 (i.e., same y-axis and same z-axis). FIG. 4C illustrates that the view 402 from the first sensor device 102 may be larger than the views 404, 406 from the third and second sensor devices 106, 104, respectively. This may be due to the first sensor device 102 being placed at a different depth (or z-axis coordinate) than the other sensor devices 104, 106.

Figure 4D:
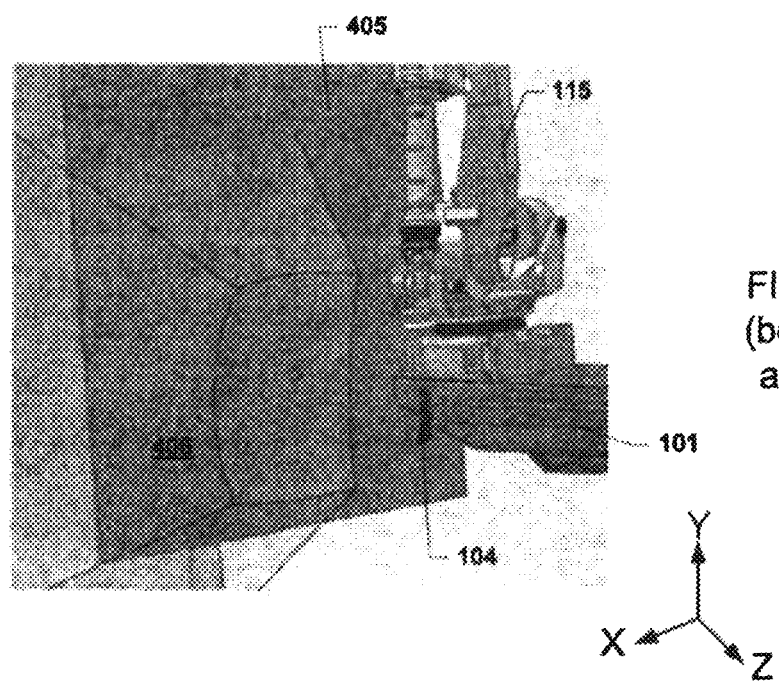

FIG. 4D illustrates a from behind, angled view of the robotic arm 115 of the robotic carton unloader 101. The second sensor device 104 is shown to be placed to the side of the robotic arm 115 and have a view 406 of the wall of items 405 that is low. FIG. 4E illustrates a from-behind, angled view of the robotic arm 115 of the robotic carton unloader 101. FIG. 4E depicts a representation of the robotic carton unloader 101 from the opposite side than FIG. 4D.

The third sensor device 106 is shown to be placed to the side of the robotic arm 115 and have a view 404 of the wall of items 405 that is low. FIG. 4F illustrates another from-behind view of the robotic arm 115 of the robotic carton unloader 101.

Figure 5:
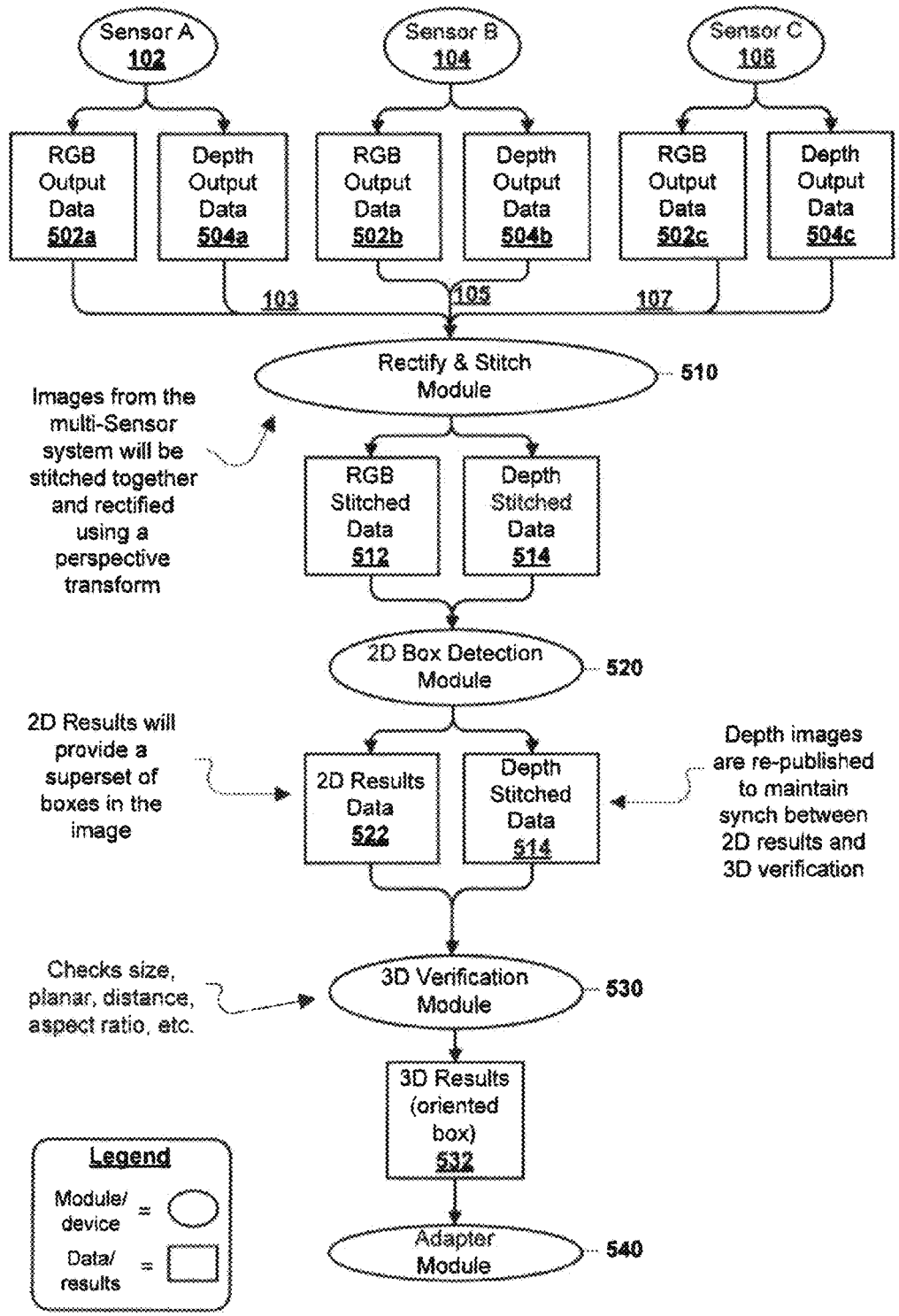
FIG. 5 is a component block diagram of embodiment modules and data utilized by a computing device associated with a robotic carton unloader to identify items to be unloaded within imagery.

FIG. 5 illustrates embodiment modules and data utilized by a computing device associated with a robotic carton unloader to identify items to be unloaded from an unloading area. The modules or devices 102, 104, 106, 510 illustrated in FIG. 5 may be any combination of devices (e.g., sensor devices), hardware components, software modules, routines, circuits, and/or logic that may be associated with and utilized by the robotic carton unloader when positioned within the unloading area to remove items (e.g., boxes, cartons, etc.). For example, the modules 510, 520, 530, 540 may be applications executing on the processor of the computing device mounted on the robotic carton unloader.

Figure 6A:
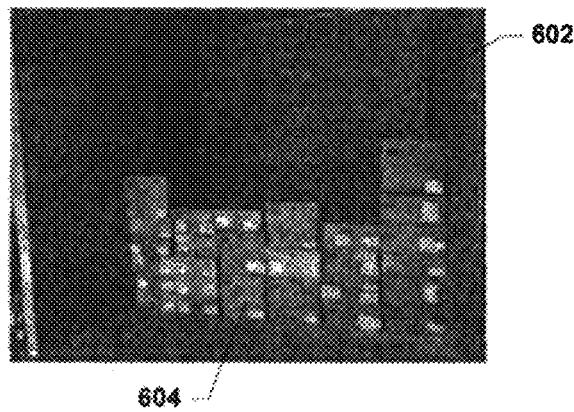
FIGS. 6A-6E are views illustrating image data at various stages of processing by a computing device performing an embodiment method.

Each of the sensor devices 102, 104, 106 (referred to in FIG. 5 as Sensor A, Sensor B, and Sensor C, respectively) may be configured to capture or record sensor data when the robotic carton unloader is within the unloading area. Based on the recording operations, the sensor devices 102, 104, 106 may be configured to generate output data, such as color or RGB output data 502a-c from an RGB camera and depth output data 504a-c from a depth sensor included within each of the sensor devices 102, 104, 106. The output data 502a, 504a from the first sensor device 102 may be transmitted to the processor of the computing device via the connection 103, the output data 502b, 504b from the second sensor device 104 may be transmitted to the processor of the computing device via the connection 105, and the output data 502c, 504c from the third sensor device 106 may be transmitted to the processor of the computing device via the connection 107. As described above, the connections 103, 105, 107 may be wireless or wired connections, such as USB or Firewire serial bus connections. FIG. 6A described below illustrates example image data that may be transmitted by a sensor device.

The various output data 502a-c, 504a-c from the sensor devices 102, 104, 106 may be received by a rectify and stitch module 510 that may be coupled to or included within the computing device of the robotic carton unloader. For example, the rectify and stitch module 510 may be an application executing on the processor of the computing device of the robotic carton unloader. The computing device via the rectify and stitch module 510 may process the output data 502a-c, 504a-c in order to combine (i.e., stitching together) the data from the sensor devices 102, 104, 106 as well as to transform the imagery for further processing (i.e., rectifying).

Because of the equipment involved (e.g., multiple sensor devices placed at different places on the robotic carton unloader), there are multiple views of the wall of items. A projection is needed to place all the image data from the different views within a common context or visual reference point (e.g., a view from the center of the robotic carton unloader). Accordingly, in order to properly see lines and discern boxes that are present as well as box sizes within the wall of items represented in the image data, the rectify and stitch module 510 may project images to the center reference point (or common point) where the robotic arm of the robotic carton unloader is located to generate a rectified image that represents the wall of items as if all the cameras were in approximately the same place. In other words, the image data may be rectified so all images obtained look like the wall of items is being captured or looked at from the center. Such rectified images are more accurate than skewed images from different sensor devices 102, 104, 106. Rectifying the image data generates more accurate imagery to use for identifying items (e.g., boxes). In various embodiments, the rectify and stitch module 510 may require the location of the sensor devices 102, 104, 106 with respect to a center plane in order to perform the rectifying of the image data.

As an example of rectifying, the image data from the sensor devices 102, 104, 106 may be transformed so that each view appears to be originating from a common perspective point. Rectifying may involve the computing device via the rectify and stitch module 510 performing operations to "deskew" images from the sensor devices 102, 104, 106 such that objects that originally appear in the images at an angle are converted to appear directly in front of (or parallel facing) the sensor devices 102, 104, 106. In this way, the rectify and stitch module 510 may adjust the output data from each of the sensor devices 102, 104, 106 so that they have a common point of reference. 3D point clouds within the received output data from the sensor devices 102, 104, 106 may also be rectified in a similar manner so that all data shares the same center (or common) reference point.

Once the image data has the same reference point (e.g., centered via the rectifying operations), the computing device via the rectify and stitch module 510 may stitch together the various images. As an example of stitching data, as the image data from the first sensor device 102 may include a first portion of a wall of items (e.g., a view of the top of the wall), the image data from the second sensor device 104 may include a second portion of a wall of items (e.g., a view of the lower left quadrant of the wall), and the image data from the third sensor device 106 may include a third portion of a wall of items (e.g., a view of the lower right quadrant of the wall), the computing device via the rectify and stitch module 510 may combine all the image data to generate a singular, complete representation of the wall of items. When the image data is stitched together, the rectify and stitch module 510 may also stitch together a 3D point cloud together so that a 3D representation of the wall of items is also obtained. Such 3D point cloud information may be obtained from a combination of the output from the sensor devices 102, 104, 106 (e.g., depth data in combination with other imagery), or alternatively may be acquired from 3D data (e.g., LIDAR data) collected by the various sensors associated with the robotic carton unloader. In various embodiments, there may be an RGB point associated with each 3D point.

Figure 6B:
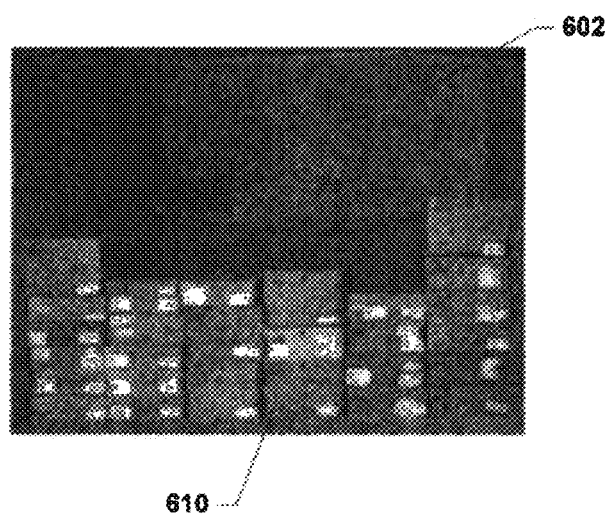

The rectify and stitch module 510 may be configured to output various data (i.e., the rectified and stitched images), including RGB stitched data 512 (or color data of the stitched together image) and depth stitched data 514 (e.g., gradated imagery showing depth indications within the imagery from the sensor devices, such as a wall of items). FIG. 6B described below illustrates example "deskewed" image data that may be generated by the rectify and stitch module 510.

Figure 6C:
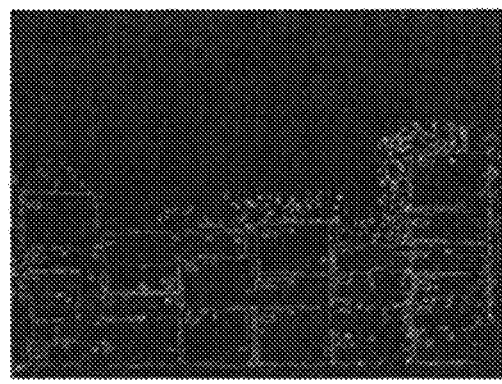
Figure 6D:
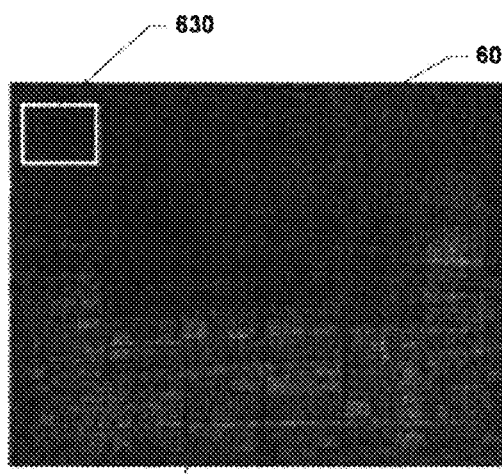

The RGB stitched data 512 and depth stitched data 514 may be received at a 2D box detection module 520. Such a 2D box detection module 520 may be coupled to or included within the computing device of the robotic carton unloader. For example, the 2D box detection module 520 may be an application executing on the processor of the computing device of the robotic carton unloader. The 2D box detection module 520 may process the received stitched and rectified data to generate results or "hypotheses" about the likely position (or presence) of items within the wall of items depicted in the rectified and stitched together output data. For example, the 2D box detection module 520 may generate 2D positions for a number of boxes that may be removed from the wall of items by the robotic arm. In other words, the computing device via the 2D box detection module 520 may generate 2D Results that provide a superset of boxes in the rectified and stitched image. Accordingly, the 2D box detection module 520 may be configured to output 2D results data 522 as well as the already generated depth stitched data 514 (e.g., gradated imagery showing depth indications within the imagery from the sensor devices, such as a wall of items). The depth stitched data 514 (or images) may be re-published to maintain synch between 2D results data 522 and 3D verification operations performed by other modules. FIGS. 6C-6D described below illustrate example processes (e.g., edge detection, box template creation, template placement, etc.) that may be performed by the 2D box detection module 520.

A 3D verification module 530 may be configured to receive the 2D results data 522 and the depth stitched data 514. Such a 3D verification module 530 may be coupled to or included within the computing device of the robotic carton unloader. The 3D verification module 530 may be utilized by the robotic carton unloader to ensure that the hypotheses of the 2D box detection module 520 are accurate by comparing the 2D results data 522 to 3D data, such as 3D point clouds stitched together by the rectify and stitch module. For example, the computing device via the 3D verification module 530 may check size, planar, distance, aspect ratio, etc. of the received 3D results.

The computing device via the 3D verification module 530 may output 3D results 532, such as data that indicates the oriented locations of boxes within the wall of items. The 3D results 532 may include only data that has been pruned with various error checking and correction algorithms as described below so that the robotic carton unloader does not utilize incorrect data to control its robotic arm in procuring items from the wall of items within the unloading area. Accordingly, the 3D results 532 may be delivered to an adapter module 540 that may be used by the robotic carton unloader to control the robotic arm. In some embodiments, the "adapter module" may provide access to 3D position information in a format appropriate for the unloading task being performed. This may be, for example, a list of results described as oriented boxes (xyz, depth width height, and rho, theta, phi), or a list of centroids of the front box faces (x,y,z). The results may be provided in a global coordinate frame relative to the unloading mechanism.

FIGS. 6A-6E illustrate images utilized at various stages of processing by a computing device performing an embodiment method. The images in FIGS. 6A-6E may be representative of the data generated and/or processes performed by the computing device via various modules as described above with reference to FIG. 5.

FIG. 6A illustrates an image (e.g., RGB image data) captured and transmitted by a sensor device located at a non-center perspective (skewed) from the wall of items 610 within an unloading area 602. FIG. 6B illustrates a deskewed version of the original image from FIG. 6A, such as after being processed via a rectify and stitch module. The deskewed image may appear flat, as if the recording sensor device was recording the imagery from a center reference point instead of its actual perspective (skewed) perspective. In some embodiments, and as described above, the deskewed image may be combined with other deskewed images from different sensor devices in order to generated a entire view of the box wall (i.e., rectifying and stitched may be performed by the robotic carton unloader on each individual field of view from each sensor device so that a combined, large view of a wall of items is created.).

FIG. 6C illustrates image data of the deskewed imagery after the computing device of the robotic carton unloader has performed edge detection operations. The white artifacts 620 within the image shown in FIG. 6C depict the detected edges of the various boxes represented in the deskewed image. In some embodiments, edges may or may not be complete based on the image quality, lighting within the unloading area 602, etc.

In various embodiments, the size of items within the wall of items 610 may be predetermined. For example, the sizes of all types of boxes that may be stored within an unloading area 602 (e.g., a shipment trailer) may be defined in shipping manifests, manufacturer specifications, etc. Accordingly, because the computing device of the robotic carton unloader may know the predetermined sizes of the items as well as the depth (or distance) to the wall of items based on captured depth sensor data, the computing device may generate a box template 630, as shown in FIG. 6D. In other words, the computing device of the robotic carton unloader may be capable of predicting how big a box is expected to be within the wall of items. Such a box template 630 may be scanned through the deskewed view of the image using the generalized Hough transform to detect boxes in the detected edges.

The computing device of the robotic carton unloader may scan through the imagery (e.g., the imagery of FIG. 6C) looking for places in the image where the box template 630 matches the edges the most. In some embodiments, once the box template 630 is compared (or passes) over a set of edges, the computing device may calculate a probability that that set of edges is indeed a box (i.e., the probability that the center of the box exists at that section of the image). In FIG. 6B, the white artifacts 631 may indicate where there are peaks in the probability (i.e., higher probability that the center of a box occurs in places). The computing device may utilize the calculated probabilities (or peaks) and compare them to predefined thresholds of peaks to generate hypotheses regarding whether a box exists at a given place within the wall of items 610 as represented in the imagery.

In various embodiments, the Hough transform (or a generalized Hough transform) may be employed by the computing device using the box template to identify boxes and not individual edges. In general, generalized Hough transform techniques may be used to identify various types of shapes within imagery. Thus, a box (or square) shape of the box template 630, having two parallel vertical lines and two parallel horizontal lines, may be compared against the image. In this way, looking for exact or predefined shapes may be more efficient that merely looking for individual edges or lines. In various embodiments, other arbitrary shapes may be detected within the imagery, such as individual lines, tubes, circular shapes, ellipses, etc. This may be beneficial when non-box (or rectangular-shaped) items are unloaded from trailers, etc.

Figure 6E:
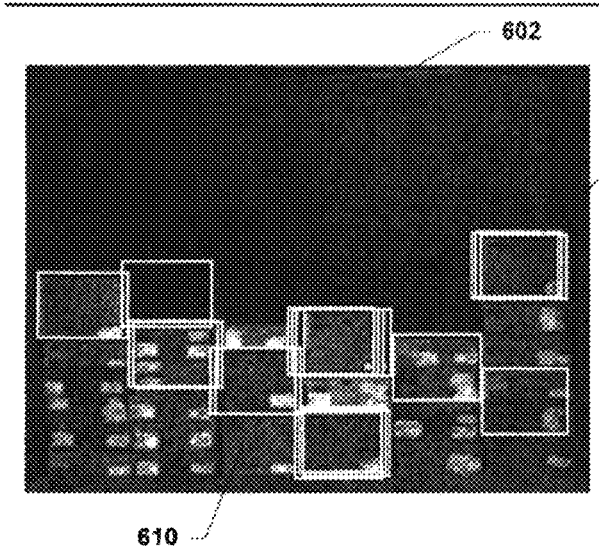

FIG. 6E illustrates the output of a 2D detection, such as performed by a computing device via a 2D box detection module as described above. Numerous box templates 640 are placed overtop the imagery at positions where boxes were calculated to have a probability of existing, as described above.

Figure 7:
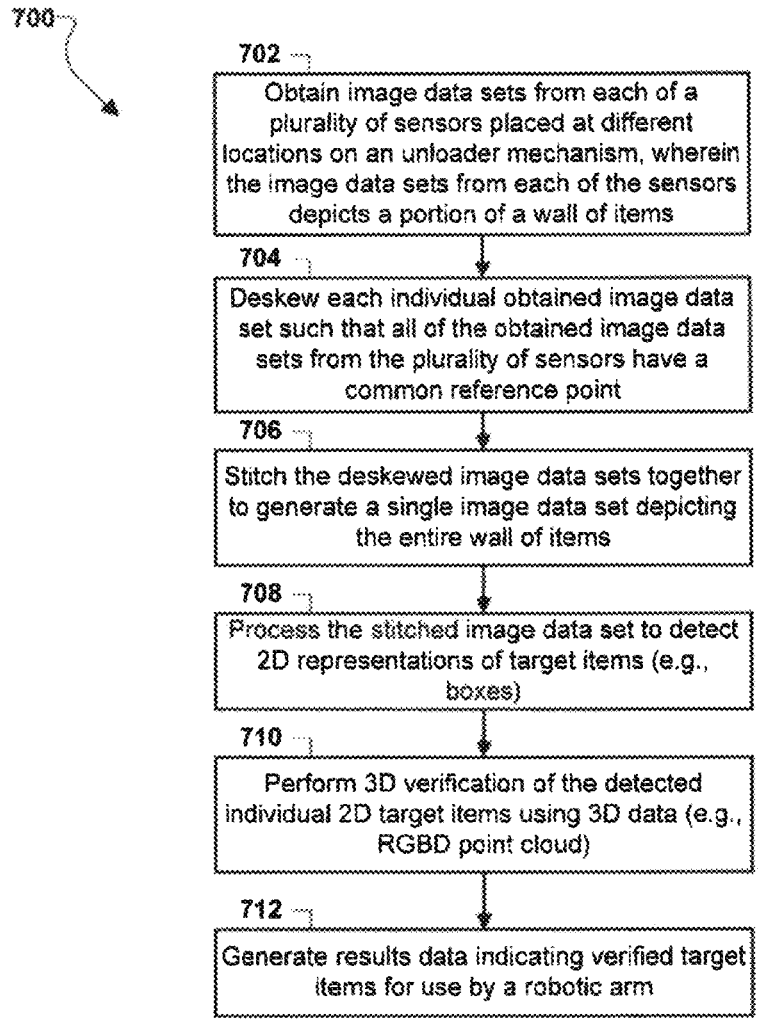
FIG. 7 is a process flow diagram illustrating an embodiment method for a computing device to process image data from a plurality of sensors to identify items to be unloaded.

FIG. 7 illustrates an embodiment method 700 for a computing device to process image data from a plurality of sensors to identify items to be unloaded. As described above, the method 700 may be performed by a computing device associated with a robotic carton unloader, such as a PC mounted on the robotic carton unloader itself. However, in other embodiments, other devices, such as remote computing devices, may be configured to perform the operations of the method 700. For example, a robotic carton unloader may be configured to transmit sensor data from on-board sensor devices via a WiFi connection to a remote computing device (e.g., a server, a desktop computer, etc.) that is then configured to perform the method 700 using the transmitted and received sensor data. In some embodiments, the method 700 may be performed by the computing device using the various modules described above with reference to FIG. 5.

In block 702, the processor of the computing device may obtain image data sets from each of a plurality of sensors (or sensor devices) placed at different locations on a robotic carton unloader, wherein the image data sets from each of the sensors depicts a portion of a wall of items (e.g., a box wall). For example, the obtained image data sets may include RGB imagery of a top portion of a wall of boxes, a bottom left portion of the wall of boxes, and a bottom right portion of the wall of boxes. In some embodiments, the obtained images may be assumed to represent defined numbers of columns of boxes (e.g., six columns of packing boxes with predefined widths and heights, etc.). Such columns may be configured such that there is little opportunity for variations in the manner in which items (e.g., boxes) may be placed within in an unloading area, and thus may enable less difficulty in identifying the target items due to the uniformity.

In block 704, the processor of the computing device may deskew each individual obtained image data set such that all of the obtained image data sets from the plurality of sensors have a common reference point. For example, the computing device may generate images that all have a common, central reference point.

In block 706, the processor of the computing device may stitch the deskewed image data sets together to generate a single image data set depicting the entire wall of items. In other words, the computing device may combine the various deskewed images that individually depict different portions of the wall of items so that a single image is generated that includes all the different portions of the wall of items (i.e., a complete picture of the wall). For example, the computing device may combine a series of small images to generate a single large image. In some embodiments, the operations of the blocks 702-706 may be performed by the computing device using the rectify and stitch module described above with reference to FIG. 5.

In some embodiments, images may not be deskewed prior to stitching. The computing device may instead perform a one-time system calibration that may identify the transformations required to stitch the multiple sensor data sets together into a consistent global coordinate frame. One time calibration may require a calibration target (e.g. a checkerboard) to calculate the transformations. Since the sensors are fixed relative to one another, these transformations may only need to be determined once, and may be applied without additional processing. Once the images/depth data are stitched, the computing device may identify the normal to the box surface and calculate an appropriate transform to rectify the images (i.e. transform the images to be square within the unloading mechanism's coordinate frame). In other words, the computing device may be configured to stitch first, using one-time calibration transformations, and rectify second by transforming the normal to the box surface to be square within the global coordinate frame.

In block 708, the processor of the computing device may process the stitched image data set to detect 2D representations of target items. For example, the computing device may detect edges within imagery and then scan the imagery (and edges) using box templates as described above. In some embodiments, the computing device may perform edge detection using a Canny edge detector technique or algorithm. In some embodiments, the parameters of the 2D detection algorithm may be configured to have various sensitivities such that the computing device may remove false positives in the detection of items (e.g., boxes). For example, by changing various thresholds in the comparison of box templates to detected edges in the imagery, the computing device may be capable of removing erroneously detected sections of the image that do not correspond to actual boxes. In some embodiments, the computing device may detect 2D representations using a series or set of templates (or box templates) of various sizes. In such a case, the computing device may be configured to detect items using the templates from smallest to largest. In this way, the computing device may be configured to avoid erroneously detecting a large box within the imagery that is actually two smaller boxes aligned together (or stacked). In other words, by starting with the smallest templates first, the computing device may generate verified items that may be used to invalidate subsequent hypotheses when using the larger templates (i.e., remove potential conflicts). In some embodiments, the operations of the block 708 may be performed by the computing device using the 2D box detection module described above with reference to FIG. 5.

In some embodiments, based on the sensitivity of the 2D detection parameters used by the computing device, the types of predefined templates, and/or the sensor data quality (e.g., lighting, etc.), certain items may be missed by the computing device during the 2D detection processing. For example, a box of a shape not already known prior to the processing may be not recognized as it did not match a known box size. In such a case, missed items may be defined as voids in the resulting output data (or simply nothing). In some embodiments, voids in the resulting output data may be skipped in subsequent processing, or alternatively may be reviewed by the computing device with various filters to determine whether items are actually within such void areas of the imagery. Alternatively, irregular items that may otherwise be voids may be shown in output data as arbitrary recognized shapes (e.g., identified objects in the middle of wall of boxes).

In some embodiments, the computing device may be configured to detect irregular shaped objects, such as cylinders, bags, trayed products, shrink wrapped products, such as bottled water. For example, a generalized Hough transform may be used to detect cylinders. These items may be treated similar to boxes, but the computing device may be less accurate in determining edges for irregular objects. However, if such irregular items do not have corresponding predefined templates accessible to the computing device, they may be treated as voids in the virtual wall of items.

Figure 9A:
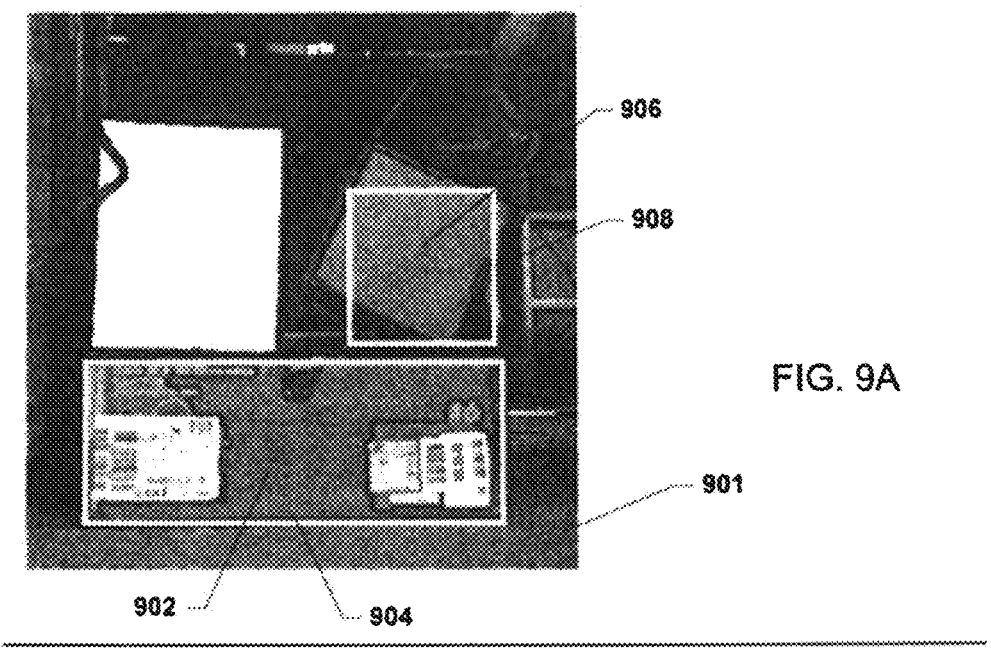
FIGS. 9A-9B are views showing an image of identified items to be unloaded before and after image processing by a computing device that accounts for angled items suitable for use in various embodiments.
Figure 9B:
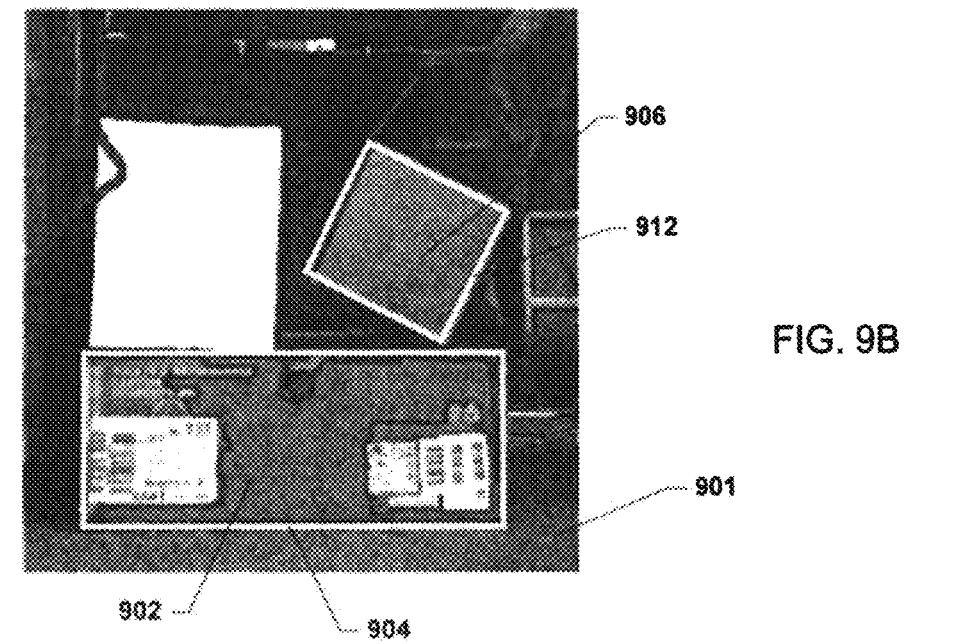

In some embodiments, the computing device may be configured to identify target items that have been oriented in atypical ways, such as being turned 45 degrees such that they rest on an edge instead of a flat surface (e.g., a box bottom). In particular, the computing device may be configured to orient predefined box templates in various ways and perform scanning to detect such oriented target items in imagery. Such orientations may be to the vertical axis and/or horizontal axis. Such additional scanning and calculations may be more costly and increase the number of scanning operations required to fully scan for particular box templates. FIGS. 9A-9B illustrate such a scenario.

Figure 8:
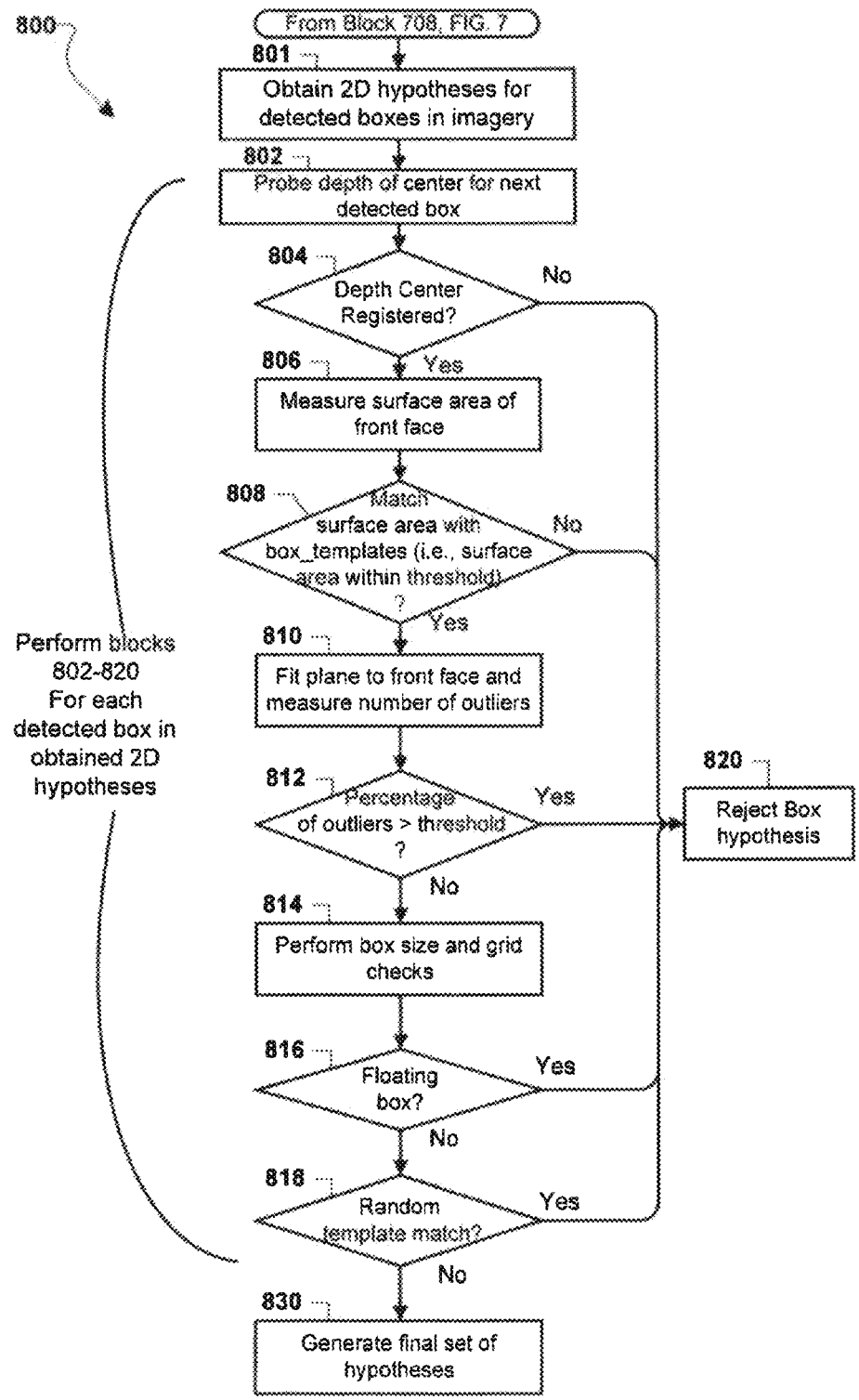
FIG. 8 is a process flow diagram illustrating an embodiment method for a computing device to perform 3D verification operations for conclusions related to imagery of items to be unloaded.

In block 710, the processor of the computing device may perform 3D verification of the detected individual 2D target items using 3D data, such as a RGBD point cloud. The 3D data may be obtained at the same time as the obtained image data sets form the plurality of sensors, or alternatively from different devices, such as LIDAR sensors associated with the robotic carton unloader. FIG. 8 described below includes operations that may be included within the block 710.

In block 712, the processor of the computing device may generate results data indicating verified target items for use by a robotic arm of the robotic carton unloader. In particular, the results data may indicate the position, depth, and orientation of boxes within the wall of items that may be retrieved by the robotic arm. In some embodiments, the results data may further include instructions, codes, and/or commands for controlling the robotic arm, such as instructions that may cause motors of the robotic arm to move the arm in various directions for various periods in order to be aligned with verified target items.

In some embodiments, it may be possible to provide the inverse kinematics and commands necessary to pick items. The "adapter" module (see FIG. 5, item 540) may be augmented to provide additional control commands, and/or prioritize the picking order.

In some embodiments, the results data may be transmitted to various modules or devices within the robotic carton unloader, such as motion controllers, or alternatively to other remote devices, such as remote computing devices or servers, for storage. In some embodiments, the results data may include cleaned up images with or without indications of box templates and/or detected target items (e.g., highlighted portions for detected boxes, etc.). In some embodiments, the computing device may utilize image export functionalities when performing the operations of block 712.

In some embodiments, the operations of the blocks 710-712 may be performed by the computing device using the 3D verification module described above with reference to FIG. 5.

In some embodiments, when the 3D data indicates there is an item (e.g., a box) in a particular location within the unloading area, however the 2D detected items do not indicate the same (e.g., there is a gap in the 2D detected items), the computing device may generate results data that indicates that the item is present that is not a target item. This may be the case with irregular shaped items (e.g., cylinders) or boxes that have been moved or oriented in unexpected ways (e.g., turned on side or at an angle).

In some embodiments, obtained image data sets may indicate items (e.g., boxes) that have fallen off of a wall of items and that may be on the floor in front of the robotic carton unloader and/or the wall of items. In such a case, the computing device may be configured to identified such fallen objects and cause an alarm to be emitted (e.g., a sound, a light, a message, a signal, a printout, etc.) that may instruct human operators to pick up the fallen objects. In some embodiments, the computing device may emit an alarm when the number of items that have been placed on a conveyor system by the robotic arm of the robotic carton unloader does not match the number of items detected by the operations of the method 700. For example, when 5 boxes have been detected with the method 700 however only 4 boxes are placed on a conveyor belt, the computing device may be configured to emit an alarm to indicate a box has likely been dropped by the robotic arm of the robotic carton unloader.

FIG. 8 illustrates an embodiment method 800 for a computing device to perform 3D verification operations for conclusions related to imagery of items to be unloaded. In general, the method 800 may include operations for pruning hypotheses generated by the computing device based on 2D detection operations (e.g., the operations in block 708 from method 700 described above). In other words, the method 800 may include operations for pruning erroneous conclusions about the detection of items within imagery, such as incorrectly identified boxes that either do not actually exist in the imagery or that do not exist in the form/shape/size determined by the computing device. Accordingly, the operations in method 800 may be performed as part of the method 700 described above. For example, the operations of the method 800 may be performed in place of the operations of blocks 710-712.

In block 801, the processor of the computing device may obtain 2D hypotheses for detected boxes in imagery. For example, the computing device may extract all box hypotheses based on edge detections using a Canny-type detection algorithm. Such 2D hypotheses may be based on an RGBD point cloud (i.e., a point cloud that includes both RGB and depth attributes).

The operations in blocks 802-820 may be performed for each individual box detected in the obtained hypotheses. However, for simplicity, the following descriptions may only refer to a detected box from the obtained data, however, all detected boxes may be fully evaluated with the operations of method 800.

In block 802, the processor of the computing device may probe a depth of center for a next detected box (i.e., the next detected box in a list of all the detected boxes). This may be a computationally cheap calculation to determine whether the detected box is actually a box or some other item that is not of interest to a robotic carton unloader (e.g., distortion, etc.). In determination block 804, the processor of the computing device may determine whether the depth center for the detected box is registered.

The RGB images and the Depth data may be registered, in other words, each pixel in the RGB images has a corresponding "pixel" in the depth image. When checking the "depth center" for a 2D result, the computing device may be verifying that there is indeed a 3D box surface present at the point where the box was detected in the 2D data. As stated below, this verification may likely average a small patch of the box surface to prevent NaN violations.

In response to determining whether the depth center for the detected box is registered (i.e., determination block 804="Yes"), the processor of the computing device may measure the surface area of front face of the detected box in block 806. In other words, the computing device may measure in order to determine whether the detected box has a face that matches with the surface area of its corresponding box template.

In determination block 808, the processor of the computing device may determine whether the measured surface area matches with predefined box templates. In other words, the computing device may determine whether the surface area of the detected box falls within acceptable threshold area values for known box types/sizes. In response to determining that the measured surface area matches with predefined box templates (i.e., determination block 808="Yes"), the processor of the computing device may fit a plane to the front face of the detected box and measure a number of outliers in block 810. For example, the computing device may place a predefined plane that corresponds to a box template to the detected box within the imagery to determine how much (if any) variance there is between the detected box and the plane. This may be a computationally expensive calculation that indicates whether the detected box has a front face that is a plane.

In determination block 812, the processor of the computing device may determine whether the percentage of outliers is greater than a predefined threshold for outliers. For example, based on the fitting and measuring of the operations in block 810, the computing device may identify the number of places the plane and a certain box do not align and compare the identified number to a stored value for an acceptable number of outliers for each detected box. In response to determining that the percentage of outliers is not greater than the predefined threshold for outliers (i.e., determination block 812="No"), the processor of the computing device may perform box size and grid checks for the detected box in block 814. These checks may include comparing the detected box size to the known sizes of a certain stock keeping unit (SKU) or set of box sizes known to be used in a particular cargo set or shipping order. If the detected box is a size that is not in the known SKU, then the detected box is likely an erroneous hypothesis. Based on the box size and grid checks, in determination block 816, the processor of the computing device may determine whether the detected box is a floating box (e.g., have a bottom edge that does not correspond with surfaces depicted in the imagery, such as box tops or the floor). In response to determining that the detected box is not likely a floating box (i.e., determination block 816="No"), the processor of the computing device may determine whether there is a random template match in determination block 818. In response to determining there is not a random template match (i.e., determination block 818="No"), the computing device may continue with the operations in block 802 to evaluate the next detected box in the obtained data. When there are no other detected boxes to evaluate, the computing device may instead continue with the operations in block 830.

In response to determining whether the depth center for each box is not registered (i.e., determination block 804="No"), or in response to determining that the measured surface areas do not match with predefined box templates (i.e., determination block 808="No"), or in response to determining that the percentage of outliers is greater than the predefined threshold for outliers (i.e., determination block 812="Yes"), or in response to determining that the detected box is likely a floating box (i.e., determination block 816="Yes"), or in response to determining there is a random template match (i.e., determination block 818="Yes"), the computing device may reject the box hypothesis for the detected box in block 820. In other words, the computing device may determine that there is not actually a valid box as identified with the 2D detection operations described in FIG. 7, and thus the detected box may be removed from further consideration. The computing device may continue with the operations in block 802 to evaluate the next detected box in the obtained data. When there are no other detected boxes to evaluate, the computing device may instead continue with the operations in block 830.

After all of the detected boxes in the obtained 2D hypotheses have been processed individually with the operations in blocks 802-820, in block 830, the processor of the computing device may generate a final set of hypotheses that do not include any rejected hypotheses. The final set may be the same results data as described above with reference to block 712 in FIG. 7. For example, the results may be data to be passed on to the robotic arm controllers.

As described above, box detection may be problematic when the boxes of a wall of items are not placed in an expected manner. For example, when boxes are laid at an angle (e.g., 45 degrees) on their edge, a computing device of a robotic carton unloader may be unable to easily detect the box as it may not match a predefined template that is not oriented at an angle. In other words, the location of detected boxes within imagery may be erroneous to boxes being at angles, regardless of the axis on which they are angled. FIG. 9A illustrates such an erroneous detection. In particular, after 2D box detection processing of the image 901, the computing device may correctly match a first box template 904 to a first box 902, however may incorrectly match a second box template 908 with an angled box 906 (i.e., the second box template 908 does not align with the edges of the actual angled box 906).

In order to avoid missing such oriented boxes, the computing device may be configured to adjust box templates when finding matches, such as during the operations of block 708 of FIG. 8. In particular, the computing device may be configured with operations that change rectangular angles and not just vertices when performing matching of templates to representations within imagery. In other words, the computing device may adjust optimization strategy to include angles (not just vertices). FIG. 9B illustrates the results of box detection processing by the computing device with additional operations for detecting boxes laid at an angle. In particular, after 2D box detection processing of the image 901, the computing device may correctly match a first box template 904 to a first box 902, as well as correctly match a second box template 912 with an angled box 906 (i.e., the second box template 912 aligns with the edges of the actual angled box 906).

Figure 10A:
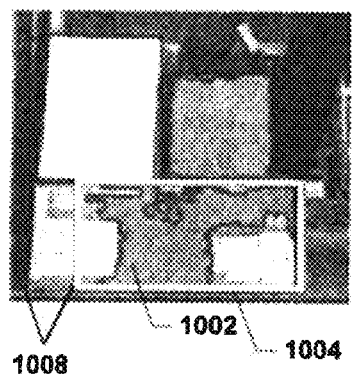
FIGS. 10A-10B are views showing an image of identified items to be unloaded with an inaccurate identification of a particular item suitable for use in various embodiments.
Figure 10B:
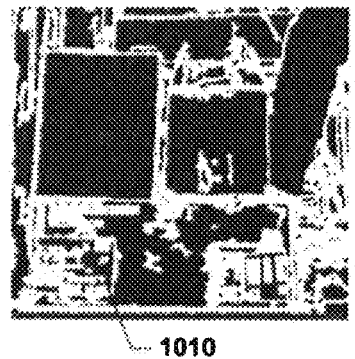

Another problematic issue with 2D box detection processing may involve incorrect detections due to labels placed on boxes in imagery. As labels are generally structured in rectangular shapes similar to box shapes, the computing device performing detection or scanning operations may incorrectly detect boxes (or their shapes, dimensions, etc.) based on labels depicted within imagery. Labels may simply break the contour of boxes (e.g., squares) within imagery. FIG. 10A illustrates the results of an incorrect processing wherein a box 1002 has been matched with an incorrect box template 1004 that is too short. The difference 1008 between the actual box 1002 and the box template 1004 may be attributed to the label at the end of the box 1002. This incorrect hypothesis of the box 1002 length may be referred to as a "shortened contour failure". FIG. 10B shows a non-RGB image of the same scenario of FIG. 10A that includes white artifacts 1010 that indicate the edges detected by the computing device.

To resolve such contouring failures due to labels or other similar aspects within imagery, the computing device may be configured to utilize bilateral filters and blurring functionalities to improve the detection operations and potentially overlook such labels. Such additional filters and functionalities may improve detections, however there may not be a technique to completely remove such erroneous conclusions that may be reached by the computing device when performing methods such as described above with reference to FIG. 7. However, it should be noted that as long as boxes are not completely covered in labels, such errors may not lead to box location failures.

In some embodiments, issues with labels breaking the contour of items within scanned imagery may be resolved by configuring the computing device to identify color changes to distinguish labels from boxes (i.e., labels are a different color (e.g., primarily white) than boxes (e.g., primarily brown, etc.)). This technique may be especially relevant for smaller boxes where the labels take up a proportionately larger portion of the box face.

In some embodiments, the computing device may be configured to utilize a threshold related to an identified area of an item that is detected to determine whether such an item is actually detected for the purposes of unloading by a robotic arm. For example, the computing device may be configured to identify elements within imagery as boxes in response to determining that a predefined surface area threshold (e.g., 75%, etc.) has been identified/confirmed. As long as the computing device identifies this amount of a box, the detection results data may be approved for further use, as then the robotic carton unloader may still successfully unload the box.

Figure 11A:
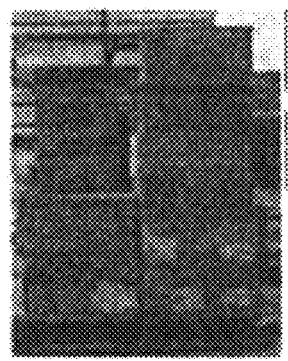
FIGS. 11A-11F are views showing an image of identified items to be unloaded before and after image processing by a computing device that accounts for distance in between items suitable for use in various embodiments.
Figure 11B:
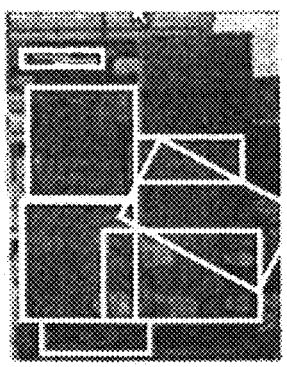
Figure 11C:
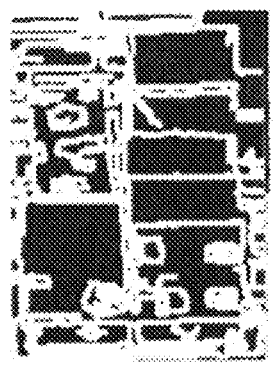

In some embodiments, large distances depicted within imagery of a wall of items may cause problems in detecting the items by the computing device as large distances may occlude edges of the items. Such issues may be caused by insufficient resolution (e.g., too small) in images captured by sensor devices of the robotic carton unloader and/or insufficient lighting of the wall of items. FIGS. 11A-11C illustrate this issue. FIG. 11A shows an image of two stacks of boxes, FIG. 11B shows box templates incorrectly matched to the boxes, and FIG. 11C shows the insufficient edge detections of the image that causes the incorrect matches.

Figure 11D:
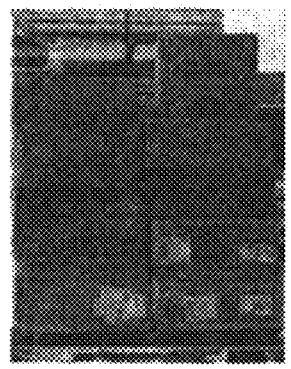
Figure 11E:
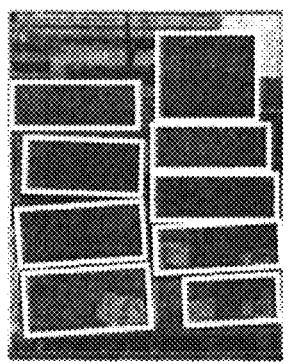
Figure 11F:
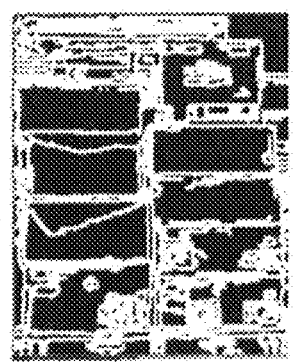

To solve such problems, human operators may be required to maintain predefined lighting and minimum required resolution standards in order to ensure sensor devices of the robotic carton unloader capture appropriate imagery for processing by the computing device. Such a minimum resolution may be translated into a max distance the sensor devices of the robotic carton unloader may be from a wall of items in order to still capture sufficient imagery. Further, imagery may be more sufficient the closer the sensor devices of the robotic carton unloader are to the items being represented in the imagery. FIGS. 11D-11F show improved detection processing results based on base images that have improved resolution and/or lighting. In particular, the resolution of the image of FIG. 11D may be higher than the resolution of the image in FIG. 11A. Accordingly, the box template matching results shown in FIG. 11E may be correct and based on the edge detections shown in FIG. 11F.

Figure 12:
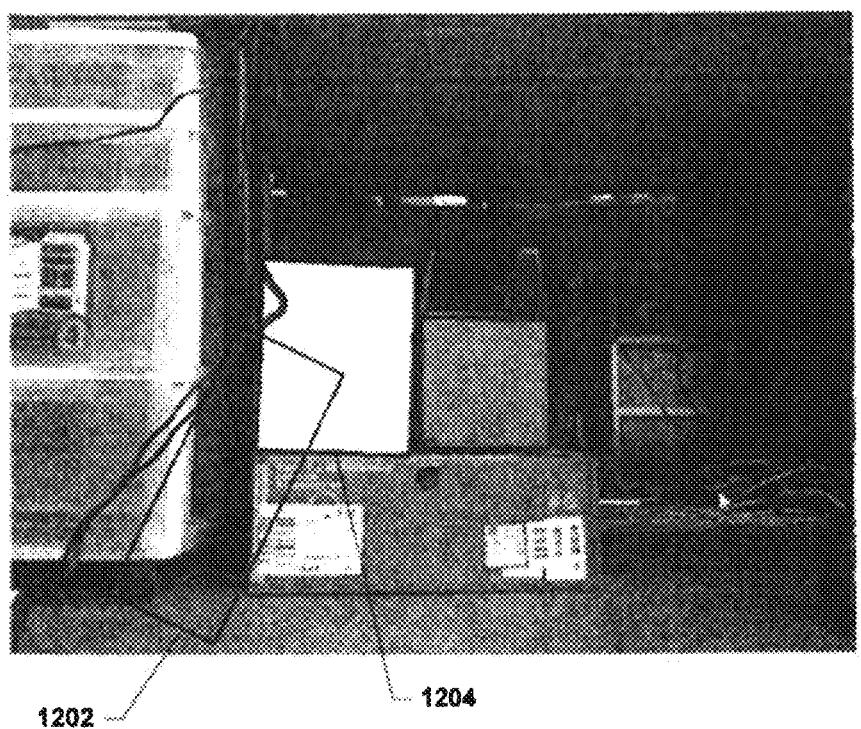
FIG. 12 is a view showing an image of spuriously identified items that may be corrected in various embodiments.

Noise in imagery captured by sensor devices may cause the computing device performing detection operations to incorrectly identify random contours as large contours (e.g., boxes). FIG. 12 shows an image of a spuriously identified item 1202 that does not actually exist. To correct such issues, the computing device may be configured to utilize error rejection routines, such as described above with reference to FIGS. 7-8. In particular, the computing device may be configured to first crop an image so that it may only depict boxes. Such cropping operations may be done autonomous/ intelligently by the computing device based on filtering out or other extraction of representations of walls of the unloading area (e.g., trailer walls). The computing device may then be configured to reject any identified and intersecting rectangles or rectangles within rectangles, etc. For example, the computing device may be configured to identify whether the identified item 1202 intersects with another item 1204, and if so, reject the identified item 1202 as spurious.

As the computing device may require continuous contours in order to properly detect items (e.g., boxes) within captured imagery, in some embodiments, the computing device may be configured to eliminate random noise from imagery processed when detecting boxes to avoid noisy or incorrect solutions. The computing device may be configured to evaluate a series of images of the same wall of items (e.g., a video selection, a series of still photos taken over a period of time, etc.) to determine whether items consistently appear in each of the photos. Since boxes in unloading areas may not disappear from the view of the sensor devices unless the robotic carton unloader is used to remove them, the computing device may require that any item to be identified as a box to be tracked in multiple images (i.e., boxes must be seen in a series of images prior to being classified as a verified box).

In some scenarios, captured image data from sensor devices may not include complete depth data (e.g., may not provide depth data for a given 20 point). Such insufficient information may cause errors (e.g., a 'nan' error). To remedy this condition, in some embodiments, the computing device may be configured to perform operations for identifying a 3D point, or average depth, for a given 20 square. In some embodiments, when probing the "depth center" of a box hypothesis, the calculation may be averaged over a small region or patch. This may prevent NaN violations caused by a single missing data point.

Figure 13A:
FIGS. 13A-13E are views showing an image of identified items to be unloaded before and after image processing by a computing device that prunes the identified items to remove erroneously identified items suitable for use in various embodiments.
Figure 13B:
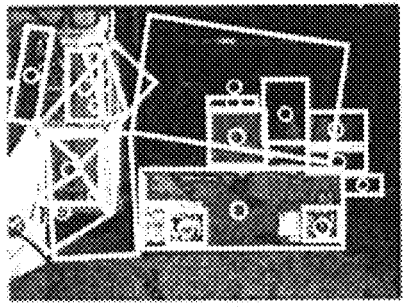

FIGS. 13A-13E show imagery of identified items to be unloaded before and after image processing by a computing device that prunes the identified items to remove erroneously identified items. Such pruning may be performed by the computing device of a robotic carton unloader performing the operations of the methods 700-800 described above. FIG. 13A shows a base image of two boxes 1302, 1304 stacked together. FIG. 13B shows contours identified by the computing device after performing box template matching operations as described above. The contours in FIG. 13B do indicate the contours of the boxes 1302, 1304, however also include numerous incorrectly identified contours that do not belong to boxes.

Figure 13C:
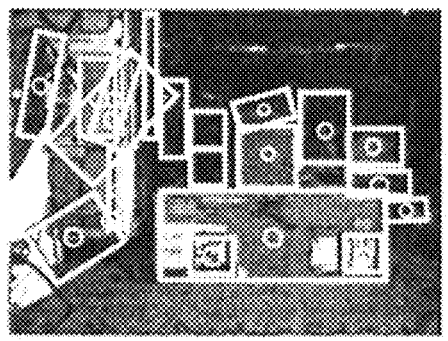
Figure 13D:
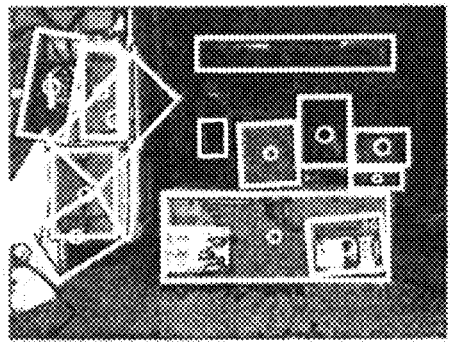
Figure 13E:
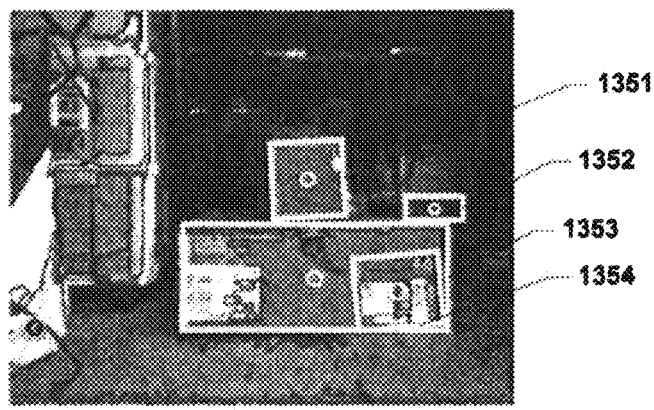

FIG. 13C shows the results of additional processing by the computing device that looking at the center of the region of each of the identified boxes. The computing device may be configured to reject identified boxes if the center of a box is not a flat plane. FIG. 13D shows the results of the computing device performing operations to calculate the surface area of the front planes of the various identified boxes. The computing device may then be configured to reject identified boxes that have surface areas that are below a predefined threshold (e.g., too small/tiny). FIG. 13E shows the results of the "pruning" or verification operations performed by the computing device. Several boxes 1351, 1352, 1353, 1354 may be identified, and only a portion may actually be boxes. The detection process may generate a large number of hypotheses. The hypotheses may be filtered on many criteria (size, rectangularity, aspect ratio, duplicate detections, etc), and results may be pruned using both 2D and 3D information.

However, it should be noted that the computing device has greatly reduced the number of false positive identifications as shown in FIG. 13B. With additional tuning of the various threshold values utilized by the computing device, the computing device may be capable of only identifying the desired, actual box contours.

Figure 14:
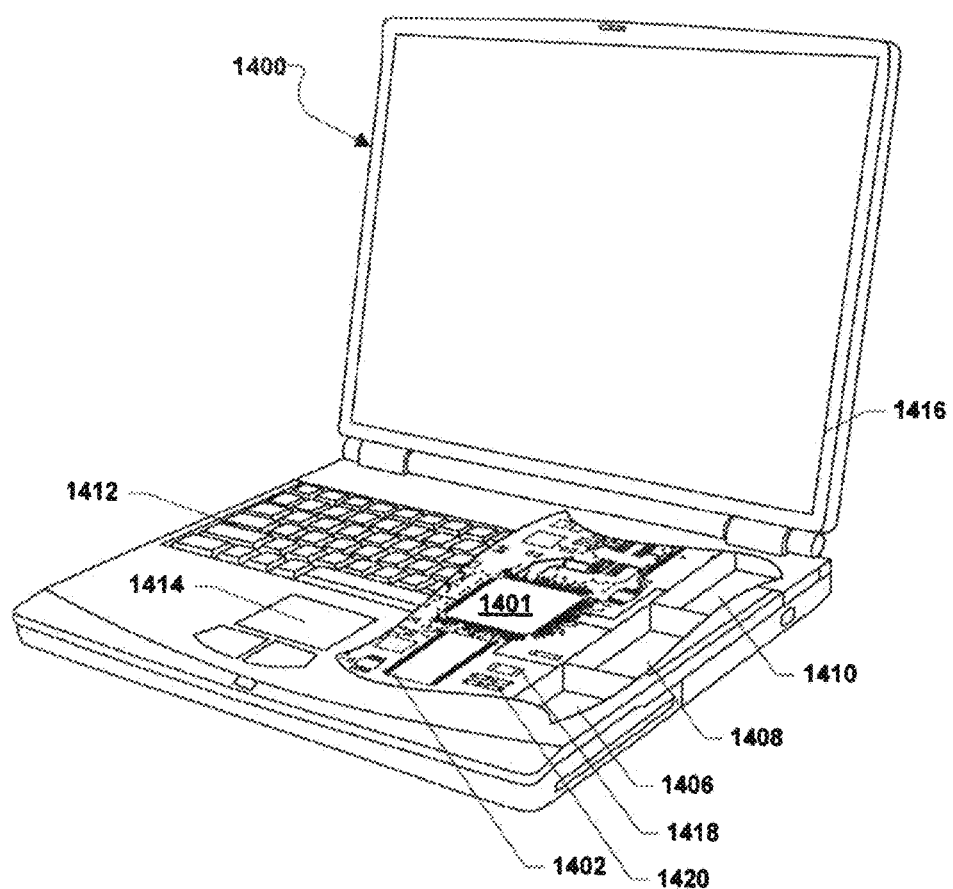
FIG. 14 illustrates a perspective view of an additional robotic carton unloader with a robotic arm, mobile body, conveyor system, and sensors of a vision system according to the various embodiments

FIG. 14 shows an embodiment robotic carton unloader 1400 for quickly and efficiently moving items (e.g., cartons, boxes, etc.) from unloading areas, such as a truck or a semi-trailer, a store, a warehouse, a distribution center, an unloading bay, between product aisles, a rack, a pallet, and a freezer suitable for use with the various embodiments described herein. The robotic carton unloader 1400 has a mobile body 1402 sized and configured to be driven in and out of the truck on a plurality of wheels 1414 that are powered by motors. The robotic carton unloader 1400 may include a conveyor and the robot arm 1406. Robot arm 1406 may include a vacuum head 1408 movably attached to a free end of the robot arm 1406. The robotic carton unloader 1400 may include sensors 1404 and 1405, as well as a third sensor on the left side of the mobile body 1402 and all three sensors may be configured to image the items to be unloaded. The three sensors may be any type sensors, such as Kinect Version 1 or Kinect Version 2 cameras. In various embodiments, the sensors may be units of a vision system as described herein. The processors of the vision system and the controllers of the robotic carton unloader 1400 may be housed in cabinets 1410 and/or 1412. The various computing devices included in the robotic carton unloader 1400 may be capable of controlling and automating the unloading process, and driving and steering the robotic carton unloader 1400 into and out of unloading areas (e.g., semi-trailers) before, during, and after the unloading process. In an embodiment, a sensors 1404, 1405, as well as the third sensor, may be mounted in different areas of and/or with different orientations on the robotic carton unloader 1400 to image different portions of the carton face and to enable the vision system to image portions of the carton wall and provide indications of detected boxes to the PLC controlling the robotic carton unloader 1400.

Figure 15:
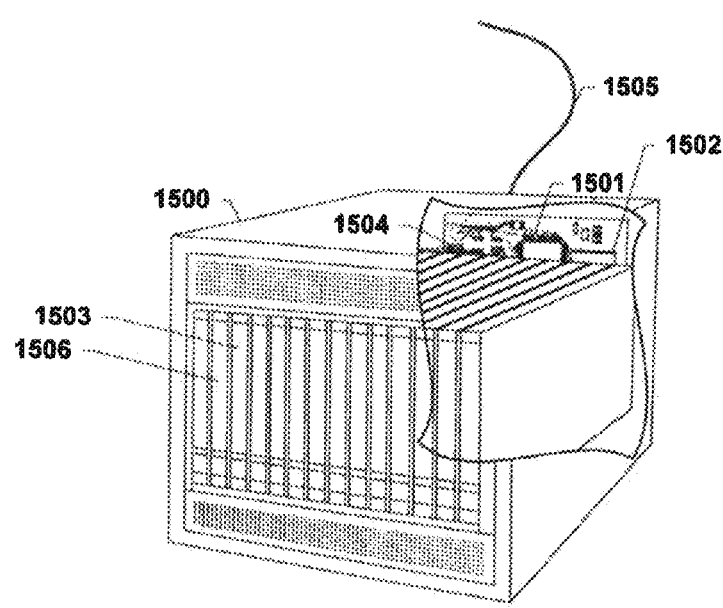
FIG. 15 illustrates a perspective view of another robotic carton unloader with a robotic arm, mobile body, conveyor system, and sensor of a vision system according to the various embodiments.

FIG. 15 shows an embodiment robotic carton unloader 1500 for quickly and efficiently moving items (e.g., cartons, boxes, etc.) from unloading areas, such as a truck or a semi-trailer, a store, a warehouse, a distribution center, an unloading bay, between product aisles, a rack, a pallet, and a freezer suitable for use with the various embodiments described herein. In general, the robotic carton unloader 1500 may include a mobile body 1510 that rolls on wheels and that may be sized and configured to be positioned within semi-trailers (e.g., driven in and out of), a robotic arm 1530 movably coupled to the mobile body 1510 and configured for extending into and retracting out of the unloading area for pulling items (e.g., cartons, boxes, etc.), and a conveyor system 1550 that extends across the top of the mobile body 1510 from front to rear and through the robotic arm 1530, which is configured to "straddle" at least portions of the conveyor system 1550.

In various embodiments, the mobile body 1510 of the robotic carton unloader 1500 may comprise a generally rectangular chassis 1512 movably supported on a four wheel configuration with each wheel adjacent to a corner of the chassis 1512. The mobile body 1510 may be attached to the robotic arm 1530 and may include various components for controlling or otherwise moving the robotic carton unloader 1500. The drive motors may drive and steer the robotic carton unloader 1500 within an unloading area (e.g., semi-trailer, etc.).

The robotic carton unloader 1500 may also include a conveyor system 1550 (e.g., descrambling conveyor) capable of guiding items (e.g., cartons, boxes, etc.) onto and along conveyors (e.g., belts, sets of rollers, etc.) that extends from a front to a rear of the robotic carton unloader 1500. The conveyor system 1550 may be wide at the front to receive items (e.g., cartons), and narrow moving from front to rear. The narrowing of the conveyor system 1550 may position the unloaded items in a line for discharge. In various embodiments, the conveyor system 1550 may discharge items at a rear of the robotic carton unloader 1500 for collection by laborers or a distribution center conveyor. In some embodiments, the conveyor system 1550 may include a rear portion that may be fixed relative to the chassis 1512 that may align or otherwise be used to connect to other conveyors, belts, platforms, etc. In other embodiments, the rear portion may be at least partially movable, including being movable to compensate for or to enable any shifts in the structure of the conveying system. Various motors may be used to drive the various elements of the conveyor system 1550 (e.g., the central descrambler 1558, the front-end descrambler 1556, etc.).

The conveyor system 1550 may include a central section (or central descrambler 1558) and a front-end descrambler 1556. The central descrambler 1558 may be located on top of the mobile body 3510 and may run underneath and through the straddle-design robotic arm 1530. The central descrambler 1558 may have various belts or sets of rollers extending front-to-rear that may run at different speeds to singulate and unscramble items placed thereon. In particular, the central descrambler 1558 may include a plurality of rows, each comprised of a plurality of rollers and configured to move items toward a rear of the conveyor system 1550, wherein the plurality of rows are on both sides of a center line 1559 running a length of the central descrambler 1558.

The front-end descrambler 1556 may be located at the front of the mobile body 1510 of the robotic carton unloader 1500. In other words, the rear of the front-end descrambler 1556 may be coupled to the front of the central descrambler 1558. The front-end descrambler 1556 may be positioned for catching items as they are dislodged from carton piles/walls by the straddle-design robotic arm 1530 and its end effector or distal end (i.e., a manipulator head 1532). The front-end descrambler 1556 may be comprised of a plurality of parallel rows of powered rollers or belts. In some embodiments, the front-end descrambler 1556 may have five parallel rows 1560a, 1560b, 1560c, 1560d, 1560e, as well as guides 1562a, 1562b for guiding items from outer rows 1560a, 1560e to inner rows 1560b-1560d. The rows 1560a-1560e may run at different speeds to singulate and unscramble items placed thereon. In some embodiments, a roller may be placed at the front of the front-end descrambler 1556 to aid in retrieval of items that are in contact with the floor.

In various embodiments, devices may be affixed to the chassis 1512 and connected to the front-end descrambler 1556 to lift the front-end descrambler 1556 off of a floor to various angular positions (or predefined angles). For example, via a hydraulic cylinder, the front-end descrambler 1556 may be raised a number of degrees so that its rows of belts or rollers are parallel with the central descrambler 1558. During operation, the front-end descrambler 1556 may be angled to meet the changing height of item piles or walls such that when a carton pile is at a maximum, the angular position of the front-end descrambler 1556 may be at a maximum, and when the carton pile is at a minimum, the angular position of the front-end descrambler 1556 may be at a minimum.

The robotic carton unloader 1500 may also have a robotically-controlled carton remover system including a robotic arm 1530 and a manipulator head 1532 that extends frontwards from the mobile body 1510 to dislodge and unload items from a front and a top of a wall or items (e.g., a carton pile or wall). The robotic arm 1530 may include an arm body 1534 and is movably coupled, attached or fixed to the mobile body 1510. In some embodiments, the manipulator head 1532 may be a vacuum manipulator head pivotally attached to the ends of an upper arm of the arm body 1534 and may be angularly positioned by a motor (not shown). Various vacuum manipulators may be attached to the manipulator head 1532 to grasp, draw, and drop items (e.g., cartons) from a wall or pile.

In various embodiments, the robotic carton unloader 1500 may also include a control and vision system as described herein. Such a control and vision system may include various visualization sensors 1501 (e.g., camera, etc.), operator interfaces (e.g., joysticks, displays, keypads, etc.), and processors, and may be capable of controlling and automating the unloading process, and driving and steering the robotic carton unloader 1500 into and out of unloading areas (e.g., semi-trailers) before, during, and after the unloading process. In an embodiment, a sensor 1501, such as a Kinect version 1 or Kinect version 2 sensor, may be mounted on the manipulator head 1532 to enable the vision system to image a portion of the carton wall and provide indications of detected boxes to the PLC controlling the robotic carton unloader 1500. For example, such a control and vision system may provide timing, sequencing, homing routines, and motion control for drive motors attached to various components of the robotic carton unloader 1500, such as the front-end descrambler 1556. In some embodiments, the robotic carton unloader 1500 may be configured to communicate with an external monitor using a communications system (e.g., an operator interface or Human Machine Interface (HMI) attached to the conveyor system 1550, etc.).

In some embodiments, a control and vision system may connect to remote locations or systems with a communication system, such as but not limited to a Wi-Fi system. For example, such a communications system may connect the robotic carton unloader 1500 to an external monitor (e.g., a remote warehouse or distribution center control room, a handheld controller, or a computer, etc.) and may provide passive remote viewing through the vision system of the robotic carton unloader 1500. Alternately, the external monitor may override the programming inherent in the control and vision system of the robotic carton unloader 1500 and assume active command and control of the robotic carton unloader 1500. Programming for the robotic carton unloader 1500 may also be communicated, operated and debugged through external systems such as the communications system and external monitor.

FIG. 16 illustrates an embodiment method 1600 for controlling a robotic carton unloader to unload boxes detected by a vision system. For example, the operations of method 1600 may be performed by a processor of a computing device, (e.g., a PLC) of a robotic carton unloader in communication with one or more computing device (e.g., a PC) of a vision system of the robotic carton unloader. As specific examples, the operations of method 1600 may be performed by a PLC of robotic carton unloader 101, 201, 301, 1400, or 1500 described above. The operations of method 1600 may begin in response to an indication to start unload operations received at the computing device, such as a start indication received from an operator's control pad connected to the computing device.

In block 1602 the processor may move the robotic carton unloader into position. For example, the PLC may send one or more commands to a module, such as the base motion module 320, that controls components of the robotic carton unloader (e.g., motors, brakes, etc.) to move the robotic carton unloader into an unloading area. In determination block 1604 the processor may determine whether the robotic carton unloader is in position to unload a face of the carton pile within the unloading area. For example, a distance sensor on the robotic carton unloader may determine a distance from a portion of the robotic carton unloader to the face of the carton pile and the processor may compare the determined distance to a threshold for extending a robotic arm to determine whether the robotic carton unloader is in position to unload a face of the carton pile within the unloading area. A distance less than the threshold for extending the robotic arm may indicate the robotic carton unloader is close enough to the carton pile to unload boxes, and a distance greater than or equal to the threshold for extending the robotic arm may indicate the robotic carton unloader needs to move closer to the carton pile. While discussed above as an example of moving the robotic carton unloader closer to the carton pile, in other examples the robotic carton unloader may be too close to the carton pile, too far left, too far right, and/or combinations of too far, too close, too far left, and/or too far right of the carton pile and therefore may not be in position to unload and may need to be moved.

In response to determining the robotic carton unloader is not in position to unload (i.e., determination block 1604="No"), the processor may continue to move the robotic carton unloader into position (e.g., moving forward, back, left, and/or right). In response to determining the robotic carton unloader is in position to unload (i.e., determination block 1604="Yes"), the processor may trigger box detection in block 1606. In an embodiment, triggering of box detection may include the processor sending a command (or other indication) to one or more computing device of the vision system directing the vision system to image the unloading area and provide indications of any detected boxes (or cartons) in the unloading area. In various embodiments, the vision system may image the unloading area and provide indications of any detected boxes (or cartons) in the unloading area by performing operations of one or more of methods 1700, 1800A, and 1800B described below with reference to FIGS. 17, 18A, and 18B. The processor may receive the indications of the detected boxes in block 1608. For example, the processor may receive an array, or a portion of an array, of detected validated box corner coordinates to from a server module running on a processor of a PC of the vision system. As a specific example, the processor may receive a height of each detected box plus the bottom right hand corner x, y, and z coordinates as a list of boxes detected by the vision system.

In determination block 1610 the processor may determine whether the number of boxes indicated is equal to zero. The number of detected boxes being zero may indicate that a back wall of the trailer/truck to be unloaded has been reached and no more boxes are present to unload. In response to determining the number of boxes is zero (i.e., determination block 1610="Yes"), the processor may end unload operations. In response to determining that the number of boxes is greater than zero (i.e., determination block 1610="No"), the processor may unload the detected boxes in block 1612. For example, the processor may control the robotic arm of the carton unloader to pick each box indicated in the received indication of detected boxes. The boxes may be picked individually or in groups of boxes based on the configuration of the robotic carton unloader robotic arm, and a series of picking instructions may be generated based on the received indications of the detected boxes. In determination block 1614 the processor may determine whether unloading is complete (i.e., whether all boxes indicated have been picked). In response to determining unloading is not complete (i.e., determination block 1614="No") the processor may continue unloading boxes in block 1612. In this manner, all the detected boxes may be unloaded before any further operations to re-image the area to be unloaded are undertaken and a single box detection process by the visualization system of the robotic carton unloader may be used to unload the detected boxes. For example, the entire face of the carton pile may be unloaded before the visualization system is triggered to image the carton pile again. The unloading of an entire face of the carton pile without re-imaging the carton pile as boxes are removed from the face of the carton pile may speed up unloading operations by the embodiment robotic carton unloaders in comparison to other systems in which the carton face is re-imaged during unloading. The single imaging events of the various embodiments in which the carton face is imaged, the carton face is unloaded, and not until the unloading of the current carton face is complete is the next carton face then imaged and subsequently unloaded may enable the vision system of the robotic carton unloader to be periodically active, may speed up unloading, may reduce overall processing requirements by the vision system, and/or may enable a single box detection process to be used to unload an entire face of the carton pile. In response to determining unloading is complete (i.e., determination block 1614="Yes"), the processor may return to block 1602 to move the robotic carton unloader into position and when the robotic carton unloader is again in position the processor may trigger box detection again in block 1606. In this manner, the vision system may be re-activated to image a next face of the carton pile to be unloaded after unloading of the first face of the carton pile is completed, thereby avoiding intermediate imaging of the carton pile during unloading of any single face of the carton pile.

FIG. 17 illustrates an embodiment method 1700 for detecting boxes imaged by a sensor of a vision system of a robotic carton unloader. For example, the operations of method 1700 may be performed by a processor of one or more computing device (e.g., a PC) of a vision system of a robotic carton unloader. As a specific example, the operations of method 1700 may be performed by a processor of a PC of a vision system connected to a sensor configured to image a portion of a carton face to be unloaded, such as a Kinect version 1 or Kinect version 2 sensor. In various embodiments, each sensor of a vision system of a robotic carton unloader (e.g., robotic carton unloader 101, 201, 301, 1400, or 1500 described above) may be connected to its own respective processor that may perform operations of method 1700. In this manner the operations of method 1700 may be performed on a per-sensor (e.g., per-sensor) basis in parallel across the number of sensors (e.g., 1, 2, 3, more than 3, etc.) on the robotic carton unloader to image the unloading area and provide indications of any detected boxes (or cartons) in the unloading area. The operations of method 1700 may begin in response to a trigger indication received at the processor, such as the trigger indication sent from a PLC of the robotic carton unloader described above with reference to block 1606 of method 1600 illustrated in FIG. 16.

In response to receiving the trigger, in block 1702 the processor may reset an iteration counter. An iteration counter may be a counter stored in a memory available to the processor use to track a number of attempts at detecting boxes in a working area. The iteration counter may be reset to an initial value, such as zero. In block 1704 the processor may acquire In particular, the computing device may be configured to obtain color (i.e., red-green-blue or "RGB") image data and depth (D) image data (collectively referred to as RGB-D data) from a sensor device (e.g., Kinect version 1 device, Kinect version 2 device, etc.) coupled to the computing device. As described above, a sensor device may be configured to capture or record sensor data when the robotic carton unloader is within the unloading area. For example, based on the recording operations, the sensor device may be configured to generate output data, such as color or RGB output data from an RGB camera and depth output data from a depth sensor included within the sensor device, collectively referred to as RGB-D data. The output data RGB-D data from the sensor device may be transmitted to the processor via a wired or wireless connection, such as USB or Firewire serial bus connection. Example, RGB-D data is discussed above with reference to FIG. 6A. In some embodiments, the RGB-D data may be deskewed as described above with reference to FIG. 6B. In various embodiments, the RGB-D data may be received in one or more frames.

In block 1706 the processor may perform image segmentation. In the various embodiments image segmentation may be performed by various methods, such as histogram based methods, graph based methods, clustering based methods, etc. As a specific example, the processor may perform image segmentation by the efficient graph based image segmentation process. During image segmentation the lines in the image, such as box edges, labels, holes, creases, etc. may be detected along with some value of noise in the image. In determination block 1708 the processor may determine whether sufficient frames have been received for further processing. As an example, a minimum threshold of frames of RGB-D data may be required to enable box detection, and the processor may compare the number of received frames to the minimum threshold of frames to determine whether sufficient frames have been received for further processing. In response to determining sufficient frames have not been received (i.e., determination block 1708="No"), the processor may continue to acquire RGB-D data in block 1704.

In response to determining sufficient frames have been received (i.e., determination block 1708="Yes"), in block 1710 the processor may compute an average edge image. Computing an average edge image may include performing various edge detection operations (e.g., using a Canny technique, efficient graph based image segmentation, or any other type edge detection technique) to identify edges in the image formed from the segmented RGB-D data. The result of computing the average edge image may be an edge map including the detected edges, lines, etc. In block 1710 the processor may compute the working area. For example, the processor may analyze the image including the detected edges to determine the area or interest (e.g., the unloading area), such as the inside of the truck/trailer to be unload bounded by the walls, ceiling, and floor of the truck. Additionally, the processor may detect and account for irregularities in the truck/trailer, such as a step up, back wall, half wall, etc. within the truck/trailer. In the various embodiments, the working area may be a predefined shape, e.g., a plane, selected based on the characteristics of the truck/trailer to be unloaded and may represent a likely area in which boxes (cartons) may be present. In an embodiment, the working area may be found by calculating the normals to all points in the depth data of the RGB-D data that face toward the sensor to create a preliminary area of interest. The processor may then fix a predefined working area plane to the preliminary area of interest to create the working area, and the working area may be used to define boxes of interest. Specifically, bounded objects or detected boxes that are aligned on the predefined working area plane or within a tolerance of the predefined working area plane may be identified as valid, and bounded objects or detected boxes that are not within a tolerance of the predefined working area plane may be rejected.

In block 1714 the processor may mask the edge map with the computed working area. For example, the processor may overlay a representation of the working area over the edge map. In block 1716 the processor may perform object detection in the masked edge map via multi-threshold object detection to identify bounded objects in the working area. In some embodiments, the processor may be configured to locate attributes of all identifiable bounded objects (e.g., boxes, labels, holes, etc.) within the masked edge map via multi-thresholding object detection operations, such as applying Hough transforms, etc.

In block 1718 the bounded objects detected in the masked edge map may be seeded with boxes. To seed boxes the processor may fit a plane to a center of the front face of the bounded object and may increase the size of the plane until the plane is the size of the bounded object. Seeded or identified boxes may be stored in a memory available to the processor, for example in an array. Each box may have a set of four corners, each with an x, y, and z value, and the processor may track each box as a set of corner values in the array. In this manner, the x, y, and z coordinates of a box's corners may operate as a box identifier and a unique description of the location of the box in the working area. In block 1720 the processor may optimize the seeded boxes. For example, the processor may determine whether a front face of the seeded boxes are aligned with the plane of the working area within a tolerance. Boxes that are not aligned within a tolerance may be rejected as potential boxes. In this manner, boxes behind the current face of the carton pile to be unloaded may be excluded from the list of detected boxes. For example, rejected boxes may be deleted from the array of seeded boxes. In block 1722 the processor may perform box size verification. In the various embodiments, the potential sizes, (e.g., height, width, depth, etc.) of the boxes to be unloaded from the truck/trailer may be predetermined and stored in a box size table stored in a memory available to the processor. The box size table may be an updatable table (i.e., boxes may be added to, subtracted from, or modified), and boxes of different sizes may be described in the box size table. The processor may verify the sizes of the seeded boxes by determining whether the heights, widths, and/or depths of the bounded objects match box sizes in the box size table. A bounded object (e.g., a seeded box) matching the sizes in the box size table may be identified as the box correlated with the matching size in the box size table. In some embodiments, the processor may determine whether the heights, widths, and/or depths of the bounded objects match box sizes in the box size table within a percentage to identify matching boxes. Boxes that are too small may be combined by the processor to create larger boxes which may be tested against the sizes in the box size table. For example, creases or other lines in the boxes may create false edges on a box face resulting in false smaller boxes being seeded on the actual larger box. The processor may combine these false smaller boxes into a single larger actual box that matches a box size in the box size table.

In block 1724 the processor may gap fill to create boxes where boxes were not seeded initially. In an embodiment, the processor may overlay all the verified boxes in a light color on a dark plane representing the working area. In the remaining dark space, the processor may again attempt to seed boxes. For example, the processor may fit a plane to a center of the remaining dark spaces and may increase the size of the box until the plane is the size of the dark spaces. When the plane size matches the size of a box in the box size table, the processor may identify the dark space as a valid box and add the coordinates for this new box to the list of identified boxes.

In block 1726 the processor may attempt to detect logos, labels, and/or holes in each of the identified boxes. For example, the processor may analyze the image area corresponding to each identified box to check for hole, logos, and/or labels on the box as a way to validate that the box is actually a box, and not some other feature, such as a step in the truck/trailer, back wall, etc. To look for holes, logos, and/or labels, the processor may first create a histogram of the area bounded by an identified box in the image of the working area. The processor may identify the most common color in the bounded area as the box color (or background color) and remove all pixels/portions within a range of that box color. In this manner, the remaining pixels/portions may be the labels, holes, and/or logos affixed to the box. The processor may scan a region of the area bounded by a box, such as a center portion of the upper half of the box, to look for holes by looking for pixels/portions that are black. If a set of pixels/portions that are black are discovered, the processor may indicate a hole was detected for the box. For example, the processor may indicate a value in a portion of the array for the box being analyzed that indicates a hole was detected. The processor may scan a region of the area bounded by a box, such as left upper portion of the box, to look for logos by looking for pixels/portions that are not near black, not near white, and not near the box color (e.g., within some predefined color range of black, white, and the box color). If a set of pixels/portions that are that are not near black, not near white, and not near the box color are discovered, the processor may indicate a logo was detected for the box. For example, the processor may indicate a value in a portion of the array for the box being analyzed that indicates a logo was detected. The processor may scan a region of the area bounded by a box, such as lower portion of the box, to look for labels by looking for pixels/portions that are near white (e.g., within some predefined color range of white). If a set of pixels/portions that are that are near white are discovered, the processor may indicate a label was detected for the box. For example, the processor may indicate a value in a portion of the array for the box being analyzed that indicates a label was detected. In this manner, each detected box may be scanned for logos, labels, and holes, and the data stored for each box may indicate whether logos, labels, and/or holes were detected for that box. While described as searches for labels, logos, and holes or various colors. Other features of the boxes may be detected based on their relative differences from the color of the box in a similar manner.

In block 1728 the box hypothesis (i.e., the detected boxes) may be validated. For example, boxes that include logos, labels, and holes may be identified as valid boxes. When a box is missing a logo, label, and/or hole, the processor may look to adjacent boxes to determine whether those adjacent boxes include logos, labels, and holes. If the adjacent boxes have a logo, label, and hole, the processor may still allow the box to be validated since its neighbor boxes were valid. Boxes that do not have valid neighbors may be rejected. In this manner, boxes with holes that may not always be punched all the way through, color schemes that are unexpected, and/or labels torn off may be distinguished from walls or other features of the truck/trailer. Thus, even though edges and potential boxes may be initially misidentified on a back wall or an elevated portion of a truck/trailer, these false boxes can be rejected by the logo, label, and hole validations.

In determination block 1730 the processor may determine whether the number of detected boxes is greater than zero. In response to determining the number of detected boxes is zero (i.e., determination block 1730="No"), in determination block 1732 the processor may determine whether the iteration counter is greater than 2. In response to determining the iteration counter is less than 2 (i.e., determination block 1732="No"), the processor may remove points from the point cloud in the previous working area in block 1734. In this manner, the processor may prepare to re-check the working area for boxes because boxes were not previously detected. In block 1736 the processor may increment the iteration counter, and in block 1712-1728 may again attempt to detect boxes in the image as described above.

In response to determining the number of boxes detected is not zero (i.e., determination block 1730="Yes") or in response to having attempted to detect boxes more than twice (i.e., determination block 1732="Yes"), the processor may send the indications of any detected boxes in block 1738. For example, the processor may send the array, or a portion of the array, of detected validated box corner coordinates to a master server module. As a specific example, the processor may compute a height of each detected box and send the height plus the bottom right hand corner x, y, and z coordinates to the master server as a list of boxes. The master server module may be running on the computing device (e.g., the same processor of the PC performing operations of method 1700) or to a different computing device (e.g., another processor of a different PC of the visualization system of the robotic carton unloader).

FIG. 18A illustrates a method 1800A for providing indications of detected boxes from a vision system of a robotic carton unloader suitable for use with a three sensor vision system and FIG. 18B illustrates an embodiment method 1800B for providing indications of detected boxes from a vision system of a robotic carton unloader suitable for use with a single sensor vision system.

The operations of methods 1800A and 1800B may be performed by a processor of one or more computing device (e.g., a PC) of a vision system of a robotic carton unloader. As a specific example, the operations of method 1800A may be performed by a master server module running on a processor of a PC of a vision system connected to other PCs of the vision system, such as the PC associated with the left side sensor connected to the PCs associated with the right side sensor and the top sensor. As another specific example, the operations of method 1800B may be performed by a server module running on the processor of the PC of a vision system associated with a single sensor, such as the PC associated with a single sensor mounted on a robotic arm of a carton unloader.

Referring to FIG. 18A, in block 1802 the server module may receive indications of detected boxes from the right side sensor. For example, the server module may receive an array of detected validated box corner coordinates from a PC associated with a right side sensor performing the operations of method 1700 described above to detect boxes. As a specific example, the server module may receive a list of box heights and bottom right hand corner x, y, and z coordinates for each detected box from a PC associated with a right side sensor. In block 1804 the server module may receive indications of detected boxes from the left side sensor. For example, the server module may receive an array of detected validated box corner coordinates from another module of the PC associated with the left side sensor performing the operations of method 1700 described above to detect boxes. As a specific example, the server module may receive a list of box heights and bottom right hand corner x, y, and z coordinates for each detected box from a PC associated with a left side sensor. In block 1806 the server module may receive indications of detected boxes from the top sensor. For example, the server module may receive an array of detected validated box corner coordinates from a PC associated with a top side sensor performing the operations of method 1700 described above to detect boxes. As a specific example, the server module may receive a list of box heights and bottom right hand corner x, y, and z coordinates for each detected box from a PC associated with a top sensor.

In block 1808 the server module may transform the coordinates of the received indications of the detected boxes from the right side sensor to the left side sensor's frame of reference and in block 1810 the server module may transform the coordinates of the received indications of the detected boxes from the top side sensor to the left side sensor's frame of reference. The server module may know the location of the various sensors, and may use this information to transform the box coordinates to the same frame of reference. In this manner, all received indications of detected boxes may be in the same frame of reference and differences in sensor positioning and imaging orientations may be accounted for.

In block 1812 the server module may combine the received indications of the detected boxes, for example, by combining the lists of detected boxes. In block 1814 the server module may remove duplicate boxes. For example, portions of the fields of view of the sensors may overlap causing the same box to be detected multiple times. When duplicate boxes are detected, one of the two duplicate boxes may be removed from the list of boxes. In an embodiment, certain sensors may be better positioned to more reliably image boxes than others, and box coordinates from the sensor positioned to more reliably image boxes of the duplicates may be retained over other measurements when a duplicate is detected.

In block 1816 the server module may perform error correction on the detected boxes. For example, the server module may determine whether potential detected boxes may be combinations of two boxes of smaller size. The server module may perform error correction by verifying label, logo, and/or hole information for each box based on the neighboring boxes in a manner similar to the verification discussed above with reference to block 1728 of FIG. 17 to determine whether a box is actually two smaller size boxes. If the box is determined to be two smaller combined boxes (e.g., a 12 inch box that is actually two 6 inch boxes), the list of detected boxes may be updated. If the potential errors in the indicated boxes cannot be resolved, an error correction failure may occur. In determination block 1818 the server module may determine whether an error correction failure occurred. In response to determining an error failure occurred (i.e., determination block 1818="Yes"), the server module may indicate an error in block 1820. In response to determining an error failure did not occur (i.e., determination block 1818="No"), the server module may transform the indications of the detected boxes to a robotic arm frame of reference. The server module may know the location of the various sensors and the robotic arm, and may use this information to transform the box coordinates to the frame of reference of the robotic arm. In block 1824 the server module may send indications of the detected boxes. For example, the server module may send the array, or a portion of the array, of detected validated box corner coordinates to a PLC of the robotic carton unloader. As a specific example, the processor may send a height of each detected box plus the bottom right hand corner x, y, and z coordinates to as a list of boxes to the PLC of the robotic carton unloader.

FIG. 18B illustrates a method 1800B for providing indications of detected boxes from a vision system of a robotic carton unloader similar to method 1800A described above, except that in method 1800B only a single sensor's indications of detected boxes is received in block 1830. In this manner, the indications of detected boxes need not be combined or transformed prior to error correction in method 1800B because the single set of box indications are in the same frame of reference and only one set is received. The server module then performs operations of blocks 1816-1824 as discussed above to send indications of detected boxes in the robotic arm frame of reference.

Various forms of computing devices, including personal computers (PCs) (e.g., a laptop computer illustrated in FIG. 19), may be used to implement the various embodiments. Such computing devices typically include the components illustrated in FIG. 19 which illustrates an example laptop computing device 1900. Many laptop computing devices 1900 include a touch pad touch surface 1914 that serves as the computer's pointing device, and thus may receive drag, scroll, and flick gestures similar to those implemented on mobile computing devices equipped with a touch screen display. Such a laptop computing device 1900 generally includes a processor 1901 coupled to volatile internal memory 1902 and a large capacity nonvolatile memory, such as a disk drive 1906. The laptop computing device 1900 may also include a compact disc (CD) and/or DVD drive 1908 coupled to the processor 1901. The laptop computing device 1900 may also include a number of connector ports 1910 coupled to the processor 1901 for establishing data connections or receiving external memory devices, such as a network connection circuit for coupling the processor 1901 to a network. The laptop computing device 1900 may have one or more short-range radio signal transceivers 1918 (e.g., WiFi, RF radio, etc.) and antennas 1920 for sending and receiving wireless signals as described herein. The transceivers 1918 and antennas 1920 may be used with the above-mentioned circuitry to implement the various wireless transmission protocol stacks/interfaces. In a laptop or notebook configuration, the computer housing may include the touch pad touch surface 1914, the keyboard 1912, and the display 1916 all coupled to the processor 1901. Other configurations of the laptop computing device 1900 may include a computer mouse or trackball coupled to the processor (e.g., via a USB input) as are well known, which may also be used in conjunction with the various embodiments. While illustrated as a laptop computing device 1900 including a display 1916, keyboard 1912, and touch pad touch surface 1914, the personal computers (PCs) discussed herein need not include displays, keyboards, or other controls. For example, other personal computer (PC) form factors suitable for use with the various embodiments may include ruggedized PCs without monitors, tower PCs, mini-PCs, etc.

The various embodiments may be implemented on any of a variety of commercially available server devices, such as the server computing device 2000 illustrated in FIG. 20. Such a server computing device 2000 may typically include a processor 2001 coupled to volatile memory 2002 and a large capacity nonvolatile memory, such as a disk drive 2003. The server computing device 2000 may also include a floppy disc drive, compact disc (CD) or DVD disc drive 2006 coupled to the processor 2001. The server computing device 2000 may also include network access ports 2004 coupled to the processor 2001 for establishing data connections with a network 2005, such as a local area network coupled to other system computers and servers.

The processors 1901 and 2001 may be any programmable microprocessor, microcomputer or multiple processor chip or chips that can be configured by software instructions (applications) to perform a variety of functions, including the functions of the various embodiments described above. In the various devices, multiple processors may be provided, such as one processor dedicated to wireless communication functions and one processor dedicated to running other applications. Typically, software applications may be stored in the internal memory 1902 and 2002 before they are accessed and loaded into the processors 1901 and 2001. The processors 1901 and 2001 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1901 and 2001 including internal memory or removable memory plugged into the various devices and memory within the processors 1901 and 2001.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The steps of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for controlling a robotic carton unloader, comprising:
    obtaining first image data from a first sensor of the robotic carton unloader of a carton pile from a first location;
    obtaining second image data from a second sensor of the robotic carton unloader of the carton pile from a second location that is different from the first location;
    transforming at least one of the first and second image data to be in a consistent global coordinate frame as another of the first and second image data;
    combining the transformed first and second image data into combined image data;
    detecting cartons in a face of the carton pile in the combined image data from the first and second sensor;
    sending indications of the detected cartons; and
    controlling a robotic arm of the robotic carton unloader to unload the detected cartons onto a conveyor of the robotic carton unloader based on the indications of the detected cartons.

2. The method of claim 1, further comprising:
    transforming the second image data by deskewing the second image data to have a common reference point as the first image data; and
    combining the transformed first and second image data by stitching together the first image data and the deskewed second image data.

3. The method of claim 1, wherein the first and second sensors are placed at different locations and orientations around the robotic arm and fixed to a platform of the robotic carton unloader and having overlapping views to obtain a complete image of a wall of items at a given time, wherein at least one of the first and second sensors is occluded by the robotic arm in at least one position.

4. The method of claim 1, wherein controlling the robotic arm of the robotic carton unloader to unload the detected cartons onto the conveyor of the robotic carton unloader based on the indications of the detected cartons comprises controlling the robotic arm of the robotic carton unloader to unload the detected cartons onto the conveyor of the robotic carton unloader based on the indications of the detected cartons without triggering the first sensor to obtain additional image data until all the detected cartons are unloaded.

5. The method of claim 4, further comprising:
    determining that all the detected cartons are unloaded; and
    triggering the first sensor to obtain the additional image data of the carton pile to detect cartons in a next face of the carton pile in response to determining that all detected cartons are unloaded.

6. The method of claim 1, wherein:
    obtaining the first image data from the first sensor of the robotic carton unloader of the carton pile comprises obtaining image data from the first sensor of the robotic carton unloader of the carton pile in a first computing device of the robotic carton unloader;
    detecting cartons in a face of the carton pile in the first image data from the first sensor comprises detecting cartons in a face of the carton pile in the first image data from the first sensor in the first computing device;
    sending indications of the detected cartons comprises sending indications of the detected cartons from the first computing device to a second computing device of the robotic carton unloader, and
    controlling the robotic arm of the robotic carton unloader to unload the detected cartons onto a conveyor of the robotic carton unloader based on the indications of the detected cartons comprises controlling, by the second computing device.

7. The method of claim 6, wherein detecting cartons in the face of the carton pile in the image data from the first sensor in the first computing device comprises performing, by the first computing device, edge detection operations to identify edges of cartons in the face of the carton pile.

8. The method of claim 6, wherein detecting cartons in the face of the carton pile in the image data from the first sensor in the first computing device comprises detecting one or more of a hole, a label, and a logo in the image data for each detected carton.

9. The method of claim 6, further comprising:
    obtaining second image data from hall the second sensor of the robotic carton unloader of the carton pile in a third computing device of the robotic carton unloader;
    detecting cartons in the face of the carton pile in the image data from the second sensor in the third computing device;
    obtaining third image data from a third sensor of the robotic carton unloader of the carton pile in a fourth computing device of the robotic carton unloader;
    detecting cartons in the face of the carton pile in the third image data from the third sensor in the fourth computing device;

sending indications of the detected cartons from the third computing device and the fourth computing device to the first computing device; and combining the indications of the detected cartons from the first computing device, the third computing device, and the fourth computing device together to generate a master set of indications of detected cartons at the first computing device, wherein sending indications of the detected cartons from the first computing device to the second computing device of the robotic carton unloader comprises sending the master set of indications of detected cartons from the first computing device to the second computing device of the robotic carton unloader.

10. The method of claim 9, wherein the first image data from the first sensor, the second image data from the second sensor, and the third image data from the third sensor are each red, green, blue (RGB) data and depth data.

11. The method of claim 10, wherein the first sensor, the second sensor, and the third sensors are Microsoft Kinect sensors.

12. A robotic carton unloader, comprising:
a vision system, comprising:
a first sensor positioned at a first location;
a second sensor positioned at a second location positioned at a second location that is different from the first location and
a first processor connected to the first sensor,
a conveyor;
a robotic arm; and
a second processor connected to the robotic arm and the first processor of the vision system, wherein the first processor of the vision system is configured with processor executable instructions to perform operations comprising:
obtaining first image data from the first sensor of a carton pile;
obtaining second image data from the second sensor of the carton pile;
transforming at least one of the first and second image data to be in a consistent global coordinate frame as another of the first and second image data;
combining the transformed first and second image data into combined image data;
detecting cartons in a face of the carton pile in the combined image data from the first sensor; and
sending indications of the detected cartons to the second processor, and wherein the second processor is configured with processor executable instructions to perform operations comprising controlling the robotic arm to unload the detected cartons onto the conveyor based on the received indications of the detected cartons.

13. The robotic carton unloader of claim 12, wherein the first processor of the vision system is configured with processor executable instructions to perform operations such that detecting cartons in the face of the carton pile in the image data from the first sensor comprises performing edge detection operations to identify edges of cartons in the face of the carton pile.

14. The robotic carton unloader of claim 12, wherein the first processor of the vision system is configured with processor executable instructions to perform operations such that detecting cartons in the face of the carton pile in the image data from the first sensor comprises detecting one or more of a hole, a label, and a logo in the image data for each detected carton.

15. The robotic carton unloader of claim 12, wherein the first processor is configured with processor executable instructions to perform operations comprising:
transforming the second image data by deskewing the second image data to have a common reference point as the first image data; and
combining the transformed first and second image data by stitching together the first image data and the deskewed second image data.

16. The robotic carton unloader of claim 12, wherein the first and second sensors are placed at different locations and orientations around the robotic arm and fixed to a platform of the robotic carton unloader and having overlapping views to obtain a complete image of a wall of items at a given time, wherein at least one of the first and second sensors is occluded by the robotic arm in at least one position.

17. The robotic carton unloader of claim 12, wherein the vision system further comprises:
a third processor connected to the second sensor and the first processor, wherein the third processor of the vision system is configured with processor executable instructions to perform operations comprising;
obtaining the second image data from the second sensor of the carton pile;
detecting cartons in the face of the carton pile in the second image data from the second sensor, and
sending indications of the detected cartons to the first processor;
a third sensor, and
a fourth processor connected to the third sensor and the first processor, wherein the fourth processor of the vision system is configured with processor executable instructions to perform operations comprising;
obtaining third image data from the third sensor of the carton pile;
detecting cartons in the face of the carton pile in the third image data from the third sensor, and
sending indications of the detected cartons to the first processor, wherein the first processor of the vision system is configured with processor executable instructions to perform operations further comprising combining the indications of the detected cartons from the first processor, the third processor, and the fourth processor together to generate a master set of indications of detected cartons at the first processor, and wherein the first processor of the vision system is configured with processor executable instructions to perform operations such that sending indications of the detected cartons to the second processor comprises sending the master set of indications of detected cartons to the second processor.

18. The robotic carton unloader of claim 17, wherein the first image data from the first sensor, the second image data from the second sensor, and the third image data from the third sensor each are red, green, blue (RGB) data and depth data.

19. The robotic carton unloader of claim 18, wherein the first sensor, the second sensor, and the third sensors are Microsoft Kinect sensors.

20. The robotic carton unloader of claim 12, wherein the second processor is configured with processor executable instructions to perform operations such that controlling the robotic arm to unload the detected cartons onto the conveyor based on the received indications of the detected cartons comprises controlling the robotic arm of the robotic carton unloader to unload the detected cartons based on the indications of the detected cartons without triggering the first sensor to obtain additional image data until all the detected cartons are unloaded.

21. The robotic carton unloader of claim 20, wherein the second processor is configured with processor executable instructions to perform operations further comprising:
   determining that all the detected cartons are unloaded; and
   triggering the first sensor to obtain the additional image data of the carton pile to detect cartons in a next face of the carton pile in response to determining that all detected cartons are unloaded.

22. The robotic carton unloader of claim 21, wherein:
   the first processor of the vision system is configured with processor executable instructions to perform operations comprising:
      obtaining the additional image data from the first sensor of the carton pile in response to the triggering of the first sensor to obtain the additional image data of the carton pile to detect cartons in the next face of the carton pile;
      detecting additional cartons in the next face of the carton pile in the additional image data from the first sensor; and
      sending indications of the detected additional cartons to the second processor, and wherein the second processor is configured with processor executable instructions to perform operations comprising controlling the robotic arm to unload the detected additional cartons onto the conveyor based on the received indications of the detected additional cartons.

23. A vision system for a robotic carton unloader, comprising:
   a first sensor positioned at a first location;
   a second sensor positioned at a second location positioned at a second location that is different from the first location; and
   a first processor connected to the first sensor, wherein the first processor of the vision system is configured with processor executable instructions to perform operations comprising:
      receiving a trigger to obtain image data from a computing device of the robotic carton unloader,
      obtaining first image data from the first sensor of a carton pile;
      obtaining second image data from the second sensor of the carton pile;
      transforming at least one of the first and second image data to be in a consistent global coordinate frame as another of the first and second image data;
      combining the transformed first and second image data into combined image data;
      detecting cartons in a face of the carton pile in the image data from the first sensor, and
      sending indications of the detected cartons to the computing device of the robotic carton unloader to enable the computing device to control a robotic arm of the carton unloader to unload the detected cartons based on the received indications of the detected cartons.

24. The vision system of claim 23, wherein the first processor of the vision system is configured with processor executable instructions to perform operations such that detecting cartons in the face of the carton pile in the image data from the first sensor comprises performing edge detection operations to identify edges of cartons in the face of the carton pile.

25. The vision system of claim 23, wherein the first processor of the vision system is configured with processor executable instructions to perform operations such that detecting cartons in the face of the carton pile in the image data from the first sensor comprises detecting one or more of a hole, a label, and a logo in the image data for each detected carton.

26. The vision system of claim 23, wherein the first processor is configured with processor executable instructions to perform operations comprising:
   transforming the second image data by deskewing the second image data to have a common reference point as the first image data; and
   combining the transformed first and second image data by stitching together the first image data and the deskewed second image data.

27. The vision system of claim 23, wherein the first and second sensors are placed at different locations and orientations around the robotic arm and fixed to a platform of the robotic carton unloader and having overlapping views to obtain a complete image of a wall of items at a given time, wherein at least one of the first and second sensors is occluded by the robotic arm in at least one position.

28. The vision system of claim 23, further comprising:
   a second processor connected to the second sensor and the first processor, wherein the second processor of the vision system is configured with processor executable instructions to perform operations comprising:
      obtaining image data from the second sensor of the carton pile;
      detecting cartons in the face of the carton pile in the image data from the second sensor, and
      sending indications of the detected cartons to the first processor;
   a third sensor, and
   a third processor connected to the third sensor and the first processor, wherein the third processor of the vision system is configured with processor executable instructions to perform operations comprising;
      obtaining image data from the third sensor of the carton pile;
      detecting cartons in the face of the carton pile in the image data from the third sensor; and
      sending indications of the detected cartons to the first processor, wherein the first processor of the vision system is configured with processor executable instructions to perform operations further comprising combining the indications of the detected cartons from the first processor, the second processor, and the third processor together to generate a master set of indications of detected cartons at the first processor, and wherein the first processor of the vision system is configured with processor executable instructions to perform operations such that sending indications of the detected cartons to the computing device of the robotic carton unloader comprises sending the master set of indications of detected cartons to the computing device of the robotic carton unloader.

29. The vision system of claim 28, wherein the image data from the first sensor, the image data from the second sensor, and the image data from the third sensor are red green, blue (RGB) data and depth data.

30. The vision system of claim 29, wherein the first sensor, the second sensor, and the third sensors are Microsoft Kinect sensors.

\* \* \* \* \*